US012427790B2

(12) United States Patent
Litvinov et al.

(10) Patent No.: US 12,427,790 B2
(45) Date of Patent: Sep. 30, 2025

(54) EQUIPMENT AND METHODS FOR TREATING OBJECTS

(71) Applicant: VELOX-PUREDIGITAL LTD., Rosh HaAyin (IL)

(72) Inventors: Alexander Litvinov, Netanya (IL); Marian Cofler, Klar Yona (IL); Avi Feinschmidt, Holon (IL); Adrian Cofler, Gan Yavne (IL); Yaakov Levi, Klar Yona (IL); Itay Raz, Mazkeret Batia (IL)

(73) Assignee: VELOX-PUREDIGITAL LTD., Rosh HaAyin (IL)

( * ) Notice: Subject to any disclaimer, the term of this patent is extended or adjusted under 35 U.S.C. 154(b) by 81 days.

(21) Appl. No.: 18/499,425

(22) Filed: Nov. 1, 2023

(65) Prior Publication Data

US 2024/0075752 A1 Mar. 7, 2024

Related U.S. Application Data

(63) Continuation of application No. 17/487,763, filed on Sep. 28, 2021, now Pat. No. 11,850,872, which is a continuation of application No. 16/461,488, filed as application No. PCT/IL2017/051262 on Nov. 19, 2017, now Pat. No. 11,167,565, which is a continuation of application No. 15/355,430, filed on Nov. 18, 2016, now Pat. No. 10,828,886.

(51) Int. Cl.

| | |
|---|---|
| ***B41J 3/407*** | (2006.01) |
| ***B41F 21/04*** | (2006.01) |
| ***B41J 3/54*** | (2006.01) |

(52) U.S. Cl.

CPC ........... *B41J 3/40731* (2020.08); *B41F 21/04* (2013.01); *B41J 3/4073* (2013.01); *B41J 3/40733* (2020.08); *B41J 3/543* (2013.01)

(58) Field of Classification Search

CPC .. B41J 3/40731; B41J 3/40733; B41J 3/4073; B41J 3/543; B41F 21/04

See application file for complete search history.

(56) References Cited

U.S. PATENT DOCUMENTS

| | | | |
|---|---|---|---|
| 2,949,852 A | 8/1960 | Schaefer | |
| 4,257,727 A * | 3/1981 | Peyton | B65B 21/12 414/416.06 |
| 4,770,456 A | 9/1988 | Phillips et al. | |
| 4,993,651 A | 2/1991 | Ohno et al. | |

(Continued)

FOREIGN PATENT DOCUMENTS

| | | |
|---|---|---|
| CN | 101522429 A | 9/2009 |
| CN | 101674940 A | 3/2010 |

(Continued)

OTHER PUBLICATIONS

International Search Report and Written Opinion from International Application No. PCT/IL2017/051262 mailed Mar. 25, 2018.

*Primary Examiner* — David H Banh

(74) *Attorney, Agent, or Firm* — Dorsey & Whitney LLP

(57) ABSTRACT

Machinery and techniques are disclosed for applying treatment processes to surfaces of objects arranged in a form of an array of objects, and for inspecting surface areas of the objects in such object arrays before and/or after applying the surface treatment processes thereto.

20 Claims, 14 Drawing Sheets

(56) References Cited

U.S. PATENT DOCUMENTS

| | | | |
|---|---|---|---|
| 5,217,175 | A | 6/1993 | Stitz et al. |
| 6,769,357 | B1 | 8/2004 | Finan |
| 7,467,847 | B2 | 12/2008 | Baxter et al. |
| 9,579,876 | B1 | 2/2017 | Maeda et al. |
| 2003/0075339 | A1 | 4/2003 | Gano et al. |
| 2005/0016399 | A1 | 1/2005 | Holm et al. |
| 2005/0074088 | A1 | 4/2005 | Ichihara et al. |
| 2007/0222245 | A1 | 9/2007 | Maffeis |
| 2007/0241578 | A1 | 10/2007 | Maffeis |
| 2009/0044713 | A1 | 2/2009 | Fuhrmann et al. |
| 2010/0192517 | A1 | 8/2010 | Schach |
| 2010/0275556 | A1 | 11/2010 | Michelli et al. |
| 2010/0295885 | A1 | 11/2010 | Lacaze |
| 2013/0251497 | A1 | 9/2013 | Goudy et al. |
| 2013/0307962 | A1 | 11/2013 | Humphries et al. |
| 2014/0168420 | A1 | 6/2014 | Naderhirn et al. |
| 2015/0258691 | A1 | 9/2015 | Schanz et al. |
| 2016/0332309 | A1* | 11/2016 | Harrach-Salazar .......................... B25J 15/0491 |
| 2017/0066232 | A1 | 3/2017 | Litvinov et al. |

FOREIGN PATENT DOCUMENTS

| | | | |
|---|---|---|---|
| CN | 102343728 | A | 2/2012 |
| CN | 103229045 | A | 7/2013 |
| DE | 102005052506 | A1 | 5/2007 |
| DE | 102014216576 | A1 | 2/2016 |
| EP | 1679189 | A1 | 7/2006 |
| EP | 2639069 | A1 | 9/2013 |
| GB | 1203629 | A | 8/1970 |
| GB | 2035873 | A | 6/1980 |
| JP | 2001030456 | A | 2/2001 |
| JP | 2009184118 | A | 8/2009 |
| JP | 2011224910 | A | 11/2011 |
| WO | 2014076704 | A1 | 5/2014 |
| WO | 2015177599 | A1 | 11/2015 |

* cited by examiner

EQUIPMENT AND METHODS FOR TREATING OBJECTS

TECHNOLOGICAL FIELD

The invention generally relates to techniques for treatment and inspection of surfaces of objects, for holding objects for treatment or inspection, and in particular for printing on curved surfaces of objects.

BACKGROUND

Digital printing is a printing technique commonly used in the printing industry, as it allows for on-demand printing, short turn-around, and even a modification of the image (variable data) with each impression. Some of the techniques developed for printing on a surface of a three-dimensional object are described hereinbelow.

U.S. Pat. No. 7,467,847 relates to a printing apparatus adapted for printing on a printing surface of a three-dimensional object. The apparatus comprises an inkjet printhead having a plurality of nozzles, and being operative to effect relative movement of the printhead and the object, during printing, with a rotational component about an axis of rotation and with a linear component, in which the linear component is at least partially in a direction substantially parallel with the axis of rotation and wherein the nozzle pitch of the printhead is greater than the grid pitch to be printed onto the printing surface in the nozzle row direction.

U.S. Pat. No. 6,769,357 relates to a digitally controlled can printing apparatus for printing on circular two-piece cans, the apparatus including digital print-heads for printing an image on the cans and drives for transporting and rotating the cans in front of the print-heads in registered alignment.

US Patent Application No. 2010/0295885 describes an ink jet printer for printing on a cylindrical object using printheads positioned above a line of travel and a carriage assembly configured to hold the object axially aligned along the line of travel and to position the object relative to the printheads, and rotate it relative to the printheads. A curing device located along the line of travel is used to emit energy suitable to cure the deposited fluid.

GENERAL DESCRIPTION

There is a need in the art for object processing techniques that allow expediting treatment/printing processes applied to external surfaces of objects arranged in a form of an array of objects, while enabling maximal utilization (high efficiency) of the treatment/printing technology by allowing treating objects having curved surfaces of various sizes, as well as providing efficient inspection of the applied treatment/pattern being printed on the curved surfaces of the objects. It is also required that such objects treatment/printing techniques enable applying simultaneous treatment/printing to multiple objects, and retain a relatively high treatment/printing resolution, with very high system accuracies (microns), which is very challenging for real production line use. Therefore, maintaining a high efficiency level by maximizing the treatment/printing engine utilization is necessary in such techniques to perform production runs.

The present disclosure describes machinery and techniques devised for applying treatment processes to surfaces of objects arranged in a form of an array of objects, and for inspecting surface areas of the objects in such object arrays before and/or after applying the surface treatment processes thereto. In the various embodiments disclosed herein the treated objects are held by an array of grippers/mandrels, each gripper/mandrel is configured to receive a respective object of the array, and to controllably generate gripping contact with internal surface(s) of the received object, for attaching the object thereto. The grippers/mandrels can be mounted on a movable platform for axially moving the array of objects thereby carried along a lane, and/or rotate the objects about their longitudinal axes. Optionally, and in some embodiments preferably, the grippers/mandrels are positioned on the support platform (also referred to herein as carriage) such that their longitudinal axes are substantially parallel to the direction of movement the platform/carriage (i.e., parallel to the lane).

In some embodiments the grippers/mandrels comprise friction imparting element(s) configured to be controllably changed between a contracted/non-gripping state, and a deployed/gripping state. In the deployed/gripping state, one or more friction imparting element(s) are engaged with inner wall of the object placed over the mandrel to attach the object thereto. For example, in some embodiments, in the deployed/gripping state one or more friction imparting element(s) radially project from the grippers/mandrels and pressed against internal wall surfaces of the objects, to apply gripping forces thereover.

A plurality of friction imparting element(s), circumferentially distributed over each gripper/mandrel can be used for attaching the objects to the mandrels. For example, a plurality of friction imparting elements can be configured to project via a respective plurality of openings formed in each mandrel to contact inner or outer surfaces of the objects placed thereover.

Optionally, and in some embodiments preferably, one or more elastically/flexibly deformable tubular elements are used in each grippers/mandrel to contact the inner surfaces of the object. The deformable tubular element(s) can comprise a circular skirt element configured to elastically project radially from the surface of the gripper/mandrel and to be elastically be compressed towards the gripper/mandrel whenever an object is placed thereover, thereby attaching the object thereto.

In some embodiments each gripper/mandrel comprises a deformable tubular element configured to be controllably changed between an extended/non-gripping state, and a pressed/gripping state. In the extended state the tubular element is longitudinally stretched such that it is substantially held below the surface of the gripper/mandrel, thereby allowing placing an object thereon substantially without applying resistive frictions forces. The gripper/mandrel can be then changed into the pressed state by longitudinally compressing the deformable element such that circular sections thereof are radially projected above the surface area of the gripper/mandrel and pressed against internal wall surfaces of the object, thereby attaching the object thereto.

Optionally, and in some embodiments preferably, the gripper is made of a cylindrical hollow element having at least one opening and comprising at least one contact pad, the at least one contact pad being mounted for radial movement in the at least one opening for protruding outwardly therethrough for contacting and holding the object placed over the gripper. An actuator assembly mounted for axial movement inside the gripper can be used for changing the at least one contact pad between a retracted state, in which the contact pad do not protrude through the at least one opening, and an ejected state, in which the contact pad protrude through the opening.

Each contact pad is attached in some embodiment to the inner wall of the gripper by a respective elastic element. The actuator assembly can be configured to change the elastic element between a rest state for setting its respective contact pad into the retracted state, and a pressed state for setting its respective contact pad into the ejected state. In some embodiments at least one circular array of the openings is spaced apart distributed over a circumference of the gripper, and at least one array of the contact pads is used for contacting and holding the object, each contact pad being mounted for radial movement in a respective one of the openings.

Optionally, and in some embodiments preferably, the gripper comprises at least one circular channel and at least one circular friction imparting element positioned in the at least one circular channel. The circular friction imparting element having a circular bendable portion configured to protrude outwardly from the at least one circular channel, and to bend inwardly towards the channel when the object is placed over the gripper, to thereby hold the object thereover.

Alternatively, or additionally, in some embodiments in the deployed/gripping state, one or more friction imparting element(s) are engaged with outer wall of the object (e.g., neck of an object in case of a bottle), placed therearound instead of the mandrel to attach the object thereto.

In some embodiments the grippers/mandrels are configured to receive, and eject via one or more outlet apertures, a stream of pressured fluid/air configured to form a fluid/air buffer sleeve around the gripper/mandrel for facilitating placement of an object thereover substantially without (or with negligibly small) resistive friction forces. More particularly, the fluid/air buffer sleeve formed around the gripper/mandrel causes the placed object to inflate and float over the gripper/mandrel, such that it can be slid thereover without contacting surfaces thereof i.e., with no friction.

The different grippers/mandrels embodiments disclosed herein can be configured to include fluid/air passages along their lengths for preventing buildup of resistive pressures inside the objects while they are being placed over, or removed from, the grippers/mandrels. The fluid/air passages are configured to expel fluid/air from the internal volume of the object as the object is slid over and onto the gripper/mandrel, and to stream fluid/air into the internal volume of the object as the object is being removed by sliding it over and away from gripper/mandrel.

The grippers/mandrels can be arranged in one or more rows on the movable platform for receiving and holding the array of objects, and moving the array of objects thereby held along a lane comprising equipment for applying one or more object treatment processes, and/or for inspecting surfaces of the objects of the objects array carried by the grippers/mandrels. Optionally, and in some embodiments preferably, each support platform/carriage comprises two rows of grippers/mandrels extending in opposite directions from opposite sides of support member(s) of the support platform/carriage. Each row of grippers/mandrels can be provided in a form of a detachable wing of grippers/mandrels, allowing to quickly replace all grippers/mandrels of the row at once. In some embodiments, two wings of mandrels are provided in a single detachable double sided wing block assembly, configured to allow quickly replacing all grippers/mandrels of the two rows of grippers/mandrels as a single block at once. In some embodiments the support platform/carriage comprises a detachable motor module comprising one or more motors/engines, and mechanical transmission components, configured to transfer rotary movement of the one or more engines/motors to the grippers/mandrels.

A single motor is used in some embodiments to rotate all of the grippers/mandrels provided in a support platform/carriage. In other possible embodiments, each gripper/mandrel is rotated by a respective motor. Optionally, and in some embodiments preferably, the support platform/carriage comprises a respective motor for each pair of adjacently located grippers/mandrels belonging to different rows of grippers/mandrels.

An object immobilizing system is used in some embodiments to set the angular positions of one or more, or all, of the objects carried by the carriage into a predefined angular position. The immobilizing system comprises an array of immobilizing units, each configured to immobilize an object placed over one of the grippers/mandrels while a fluid/air buffering sleeve is thereby formed to prevent rotation of the object while the mandrel is being rotated. In this way the mandrels of the carriage can be rotated while some of the objects are immobilized by the immobilizing units, and thus stand still without being rotated, such that only objects not immobilized by the immobilizing units are rotated.

In some embodiments the immobilizing units are configured to immobilize one row of the carried objects while fluid/air buffering sleeves are formed by their grippers/mandrels, to thereby prevent rotary motion thereof while the mandrels are being rotated. Accordingly, the objects in other row(s) of objects, which are not immobilized by the immobilizing units, can be rotated until reaching a desired angular position. In this way, each of the objects in the row(s) which are not being immobilized can be aligned with at least one other object that is being immobilized by one of the immobilizing units. Optionally, and in some embodiments preferably, the angular position of the objects in the one row are set into a desired/predefined position before forming the fluid/air buffers and immobilizing them. Thereafter, the objects in the one row are immobilized and all objects in the other row(s) are rotated to align them with respective objects in the immobilized row, thereby setting all of the objects in the carried array into the same angular position.

The immobilizing elements can be configured to apply attraction forces over the objects, and thereby hold them substantially immobilized due to the fluid/air buffering sleeves formed by their grippers/mandrels. The attraction forces can be applied using suction/vacuum applicators, electromagnets, electric fields applicators, electrostatic forces applicators, or any combination thereof.

This techniques can be used to align each mandrel/gripper in each row mandrel/gripper carried by a support platform into a desired different, or same, angular position, and/or to align each row of mandrel/gripper of the support platform into a respective different (or same) desired angular position. These alignment schemes can be further used to align each object on each support platform of the system into a desired different, or same angular position, or to align each row of each support platform into a respective different, or same, angular position.

In some embodiments the immobilizing units of the object immobilizing system are configured to move with respect to the objects (up and down) in order to adjust their distance from the object and thereby adapt to the diameter of the mandrel/gripper, and/or the object to be treated.

The system includes in some embodiments one or more sensor units configured for recognition of variety of cap shaped objects, three-dimensional cap-shaped structures. The sensor units can be used to identify an alignment mark pre-printed on the objects, and/or a stitch located on the objects/tubes (e.g., on a laminate, or three-piece welded object such as can), and/or an unseen visual stitch that has a change in material properties at the stitch area that could be recognized by different type of sensor technology, for allowing properly aligning the objects into the a desired, and/or same, angular position.

Optionally, and in some embodiments preferably, the system includes sensor units configured for object existence validation to detect the presence or absence of an object over a gripper/mandrel, and/or for conducting length measurements to determine the length of the objects placed over the mandrels. Optionally, the sensor units can be configured for measuring the object/cap length and the length of its body length, two-dimensional longitudinal (length and height) structure, as well as three-dimensional rotational and longitudinal structure.

The inspection of the objects in the array of objects is carried out in some embodiments using at least one movable imaging unit. The movable imaging unit is configured in some embodiments to slide in sideway directions over (or below) a row of objects and acquire imagery data. The objects can be held stationary during the movement of the imaging unit and image acquisition, or alternatively, they can be moved axially and/or angularly. In some embodiments the imaging unit is configured to slide over one or more rails positioned above/below one row of objects in the array of objects carried by the support platform/carriage. Optionally, the one or more rails can be configured to move in lengthwise directions, thereby moving the imaging unit thereby carried along the lengths of the objects in the inspected row of objects.

Optionally, and in some embodiments preferably, the imager is configured for sliding movement for acquiring at least one image from each one of the objects within each sliding movement. The processing unit can be used to construct for each object a mosaic image from the images acquired therefrom.

In some embodiments two or more imaging units carried by a respective plurality of movable rails are used for inspecting respective two or more rows of objects of the array of objects. Optionally, the inspection system can comprise a respective movable imaging unit carried by its respective movable rail(s) system for inspecting each row of objects in the array of objects. The inspection system can be thus configured to assign a stationary or movable imaging unit for each row of objects in the array of objects, or in certain cases, assign two or more of the movable imaging units to inspect a certain row of objects in the array of objects carried by the support platform/carriage.

In some embodiments the imaging unit is comprised of at least one image inspection sensor/camera, at least one auto registration sensor/camera, and at least one color management sensor/camera.

One inventive aspect of the subject matter disclosed herein relates to a gripper for holding a hollow object thereon. The gripper comprising in some embodiments a body assembly configured to be at least partially received inside the object and comprising a hollow part extending along a length thereof, one or more friction imparting elements located in or on the body assembly and configured to change between an engaged state in which contact with inner surface of the object placed over the gripper is established therewith, and a released state in which there is no contact with the inner surface of the object, an attachment mechanism configured to cause the one or more friction imparting elements to engage the inner surface of the object when said object is placed over the gripper.

The attachment mechanism is configured in some embodiments to cause the one or more friction imparting elements to emerge from the body assembly and to extend above surface areas thereof.

Optionally, and in some embodiments preferably, the attachment mechanism is configured to have a ground/normal state in which the one or more friction imparting elements are set into the engaged state. In some embodiments the attachment mechanism comprises an actuator unit placed inside the body assembly and configured to change the one or more friction imparting elements into the released state for allowing placement of the object on, or removal of the object from, the gripper. The actuator can be configured to apply fluid pressure over the one or more friction imparting elements to change into the release state. The actuator unit comprises in some embodiments at least one fluid channel passing along a length of the body assembly, the fluid channel being configured for receiving and flowing fluid in a first direction from a proximal end of the channel for applying the fluid pressure over the one or more friction imparting elements. In some embodiment the body assembly comprises at least one fluid outlet opening in fluid communication with the fluid channel and configured to radially expel fluid therethrough to form a fluid sleeve over a portion of the body assembly for buffering between the body assembly and the object placed thereover and thereby changing into the released state. A fluid chamber fluidly connected to the at least one fluid outlet opening can be used to receive fluid streamed through the fluid channel and pass it to the at least one fluid outlet opening.

The one or more friction imparting elements comprises in some embodiments at least one deformable element attached to the body assembly. The attachment mechanism can be configured to compress the at least one deformable element in the ground/normal state such that some portion thereof is caused to protrude from the body assembly and contact an inner wall of the object placed thereover, and to stretch the at least one deformable element responsive to the application of the fluid pressure to radially retract said some portion of the at least one deformable element and release the object.

In some embodiments the body assembly comprises a cap element at a distal end of the gripper, a piston arrangement having a piston in fluid communication with the distal end of the hollow channel, and configured such that the fluid is directed to flow toward the piston from the distal end of the channel, in a second direction opposite to first direction, and move the piston along the second direction. The deformable element can be attached by one end thereof to the piston arrangement and by another end thereof to the cap element, such that the movement of the piston arrangement in the second direction in response to the fluid pressure causes the stretch of the deformable element. The gripper further comprises in some embodiments an elastic element coupled to the piston arrangement and being configured for applying on the piston arrangement a force in the first direction. Optionally, the elastic element comprises at least one spring.

The cap element comprises in some elements at least one first perforation configured to expel air from inside of the object into a region inside or outside the gripper. The body assembly can comprise a sleeve element surrounding at least a portion of the hollow channel, and one or more support elements mounted or formed inside the sleeve element for connecting between the sleeve and fluid channel. Optionally, one or more second perforations formed in the one or more support elements are used for passage of the expelled air to the external environment.

In some embodiments the at least one spring is disposed between piston arrangement and one of the one or more support elements.

The cap element comprises in some embodiments an internal cavity in fluid communication with a distal end opening of the fluid channel, and one or more fluid passages configured to direct fluid received from the fluid channel towards the piston. The cap element can comprise a barrel structure in fluid communication with the one or more fluid passages of the cap element and configured to sealably and movably accommodate the piston. In some embodiments the barrel and the piston arrangement are surrounding the fluid channel, and the piston arrangement is configured to sealably slide over the fluid channel in response to the fluid pressure.

Another inventive aspect of the subject matter disclosed herein refers to a gripper for holding an object, the gripper comprising a hollow body element configured to receive and hold the hollow object thereon, the hollow body comprising at least one fluid outlet opening formed in an external wall thereof, and a fluid chamber configured to receive and hold fluid pressure inside the hollow body, the fluid chamber being in fluid communication with the at least one fluid outlet opening and configured to eject fluid pressure through the at least one opening, thereby creating an air cushion between an outer wall of the hollow body and an inner wall of the object placed over the gripper.

In some embodiments the chamber has at least two fluid outlet openings in the vicinity of the distal end of the hollow body, the fluid outlet openings being disposed so as to create the air cushion symmetrically with respect to the central axis of the gripper. The hollow body element can comprise at least one passage configured to expel air from the inside of the object to an outside.

Yet another inventive aspect of the subject matter disclosed herein refers to a modular system for holding and moving a plurality of objects. The apparatus comprises a motor unit having a first plurality of ports and a second plurality of ports, disposed in two groups on opposite sides of the motor unit, a first plurality and a second plurality of mandrels, each mandrel being configured for holding a respective one of the objects, a first wing and a second wing, the first wing connecting the first plurality of mandrels to the first plurality of ports, and the second wing connecting the second plurality of mandrels to the second plurality of ports, in order to enable the motor unit to move each mandrel individually. The first plurality of mandrels and the first wing can form a first module, the first module being detachable from the motor unit, and the second plurality of mandrels and the second wing form a second module, the second module being detachable from the motor unit.

Yet another inventive aspect of the subject matter disclosed herein refers to a modular system for holding and moving a plurality of objects. The system comprising a motor unit having a first plurality of ports and a second plurality of ports, disposed in two groups on opposite sides of the motor unit, a plurality of mandrels, each mandrel being configured for holding a respective one of the objects, the mandrels being connected to the ports of the motor unit in order to enable the motor unit to move each mandrel individually, and a wagon unit, joined to the motor unit, configured for carrying the motor unit and the mandrels joined thereto along a desired path. The motor unit, together with the mandrels joined thereto, can be detachable from the carriage. The plurality of mandrels can be provided in a form a single replaceable block of mandrels.

The system comprises in some embodiments an inspection system comprising at least one moveable imager unit configured to acquire fractional images of the objects. Optionally, the at least one movable imager unit is configured to move along a row of the objects. Additionally, or alternatively, the at least one movable imager is configured to move along a length of the objects.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings. Features shown in the drawings are meant to be illustrative of only some embodiments of the invention, unless otherwise implicitly indicated. In the drawings like reference numerals are used to indicate corresponding parts, and in which:

FIGS. 2A to 2D schematically illustrate a mandrel configuration of some possible embodiments utilizing movable immobilizing elements to grip objects having different inner diameters, wherein FIGS. 2A and 2B show perspective and sectional views of the mandrel with its immobilizing elements in a retracted state, respectively, and FIGS. 2C and 2D show perspective and sectional views of the mandrel with its immobilizing elements in an ejected state, respectively;

FIGS. 3A to 3C schematically illustrate a mandrel configuration of some possible embodiments utilizing ring shaped flexible/elastic friction imparting element(s) to grip objects having different inner diameters, wherein FIG. 3A shows perspective and sectional views of the flexible/elastic friction imparting element, and FIGS. 3B and 3C show sectional views of the gripper before and after placing an object thereover;

FIGS. 5A to 5D schematically illustrate a mandrel configuration of some possible embodiments configured to build a fluid buffer/sleeve thereabout for placing an object thereover, wherein FIGS. 5A and 5B show sectional views of the mandrel demonstrating formation of the fluid buffer/sleeve and placing of the object over the mandrel, FIG. 5C shows a sectional view of the mandrel after air pressure has been decreased/stopped to remove the fluid buffer/sleeve and attach the object to the mandrel, and FIG. 5D shows a top view of the mandrel;

FIGS. 8A and 8B schematically illustrate a registration technique according to some embodiments for aligning angular orientation of objects carried by the carriage system, wherein FIG. 8A illustrates a registration system and its use and FIG. 8B is a flowchart illustrating a registration process.

DETAILED DESCRIPTION OF EMBODIMENTS

Figure 1:
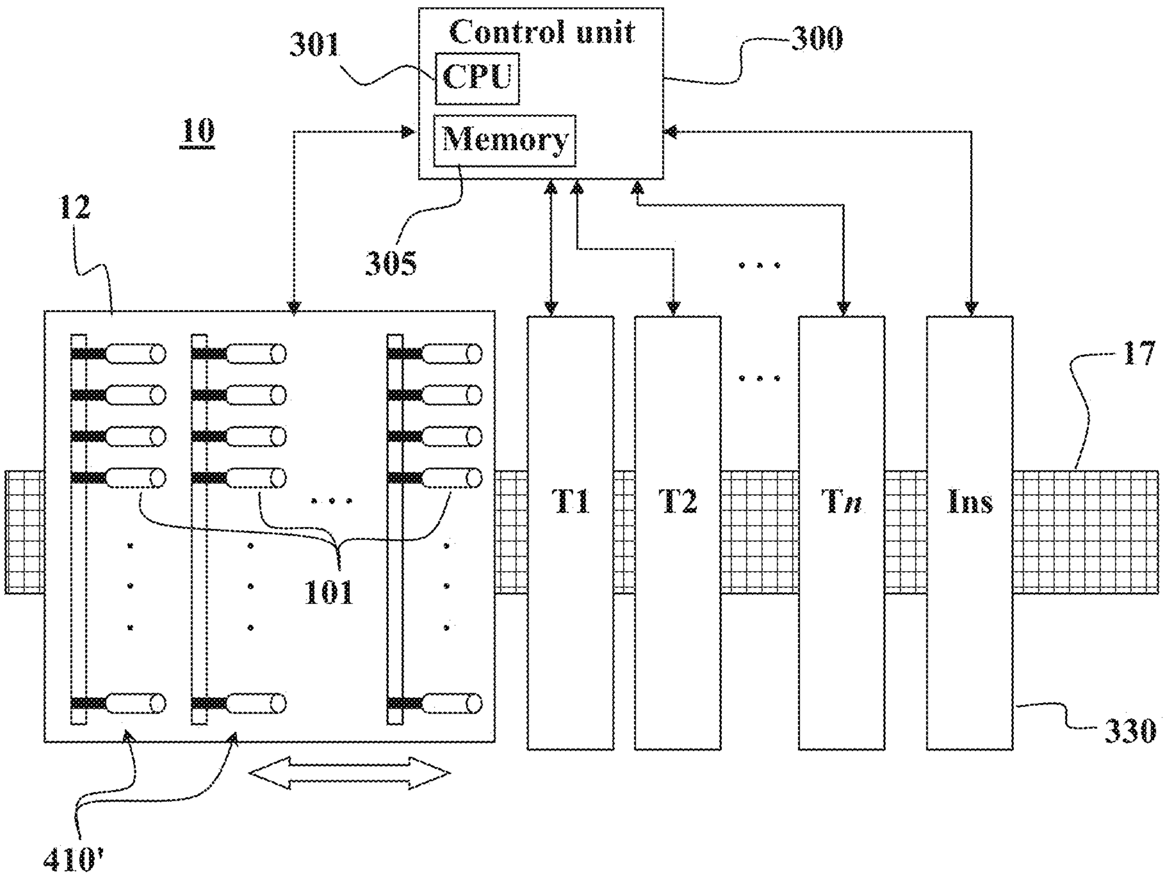
FIG. 1 schematically illustrates a system configured for treating one or more arrays of objects carried by a movable support platform, according to some possible embodiments.

The various embodiments of the present invention are described below with reference to the drawings, which are to be considered in all aspects as illustrative only and not restrictive in any manner. In an effort to provide a concise description of these embodiments, not all features of an actual implementation are described in the specification. Elements illustrated in the drawings are not necessarily to scale, or in correct proportional relationships, which are not critical. Emphasis instead being placed upon clearly illustrating the principles of the invention to allow persons skilled in the art to make and use it, once they understand its principles. This invention may be provided in other specific forms and embodiments without departing from the essential characteristics described herein.

FIG. 1 schematically illustrates a system 10 configured for treating one or more arrays of objects 101 carried by a movable support platform 12 over a lane 17. One or more object treatment processes T1, T2 . . . Tn, can be applied at one or more object treatment zones along the lane 17. Optionally, and in some embodiments preferably, at least one of the treatment processes T1, T2 . . . Tn, is applied to external surfaces of the objects 101 carried by the support platform 12 along the lane 17 as the support platform passes through the respective object treatment zone.

For example, and without being limiting, the one of the treatment processes T1, T2 . . . Tn, can comprise printing at least on outer surfaces of the objects 101, cleaning at least the outer surfaces of the objects 101, ink curing treatment (e.g., UV curing), surface treatments comprising plasma treatment, corona treatment, treatment by electromagnetic radiation such as laser light, or any combination of these treatments. In some embodiments the lane is a closed loop lane, and the support platform is configured to carry one or more arrays of the objects 101 thereon, as described in international patent publication No. WO 2014/076704 and/or WO 2015/177599, of the same applicant hereon, the disclosures of which is incorporated herein by reference.

A control unit 300 comprising one or more processors 301 and memories 305 can be used to monitor and control the movement of the support platform 12 along the lane 17, and the application of the one or more treatment processes T1, T2 . . . Tn, to the objects 101 carried thereon. The support platform 12 comprises one or more arrays of object grippers 410', each object gripper 410' configured to receive and hold one object 101 thereon. Optionally, and in some embodiments preferably, each object gripper is also configured to controllably rotate the object 101 thereby held about an elongated axis thereof, responsive to control signals/data received from the control unit 300.

In this specific and non-limiting example each array of grippers 410' is configured to hold one row of objects 101, and the objects rows of the grippers arrays 410' are arranged substantially parallel one to the other. As will be demonstrated herein below with reference to FIGS. 6 to 8, in some embodiments each array of grippers 410' is configured to receive and hold at least two rows of the objects 101. Optionally, and in some embodiments preferably, each row of objects 101 is arranged on the support platform 12 along an axis being substantially perpendicular to the direction of movement of the support platform 12 (perpendicular to the lane), and the objects 101 are held by the grippers such that the elongated axis of each held object 101 is substantially parallel to the movement direction of the support platform 12 (parallel to the lane).

Figure 2A:
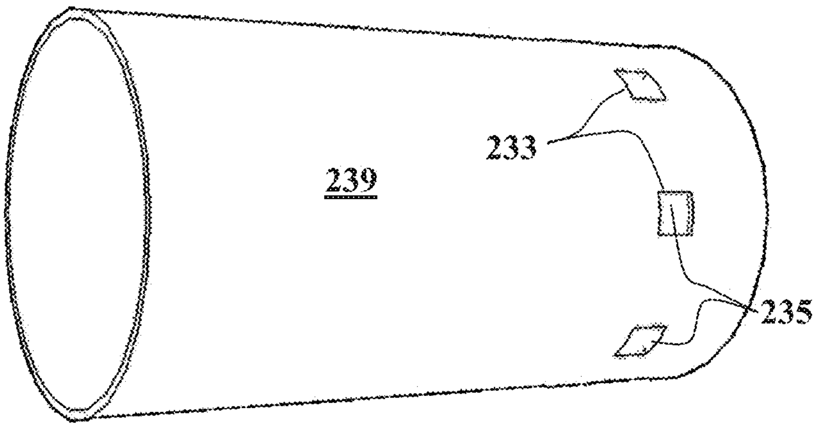
Figure 2B:
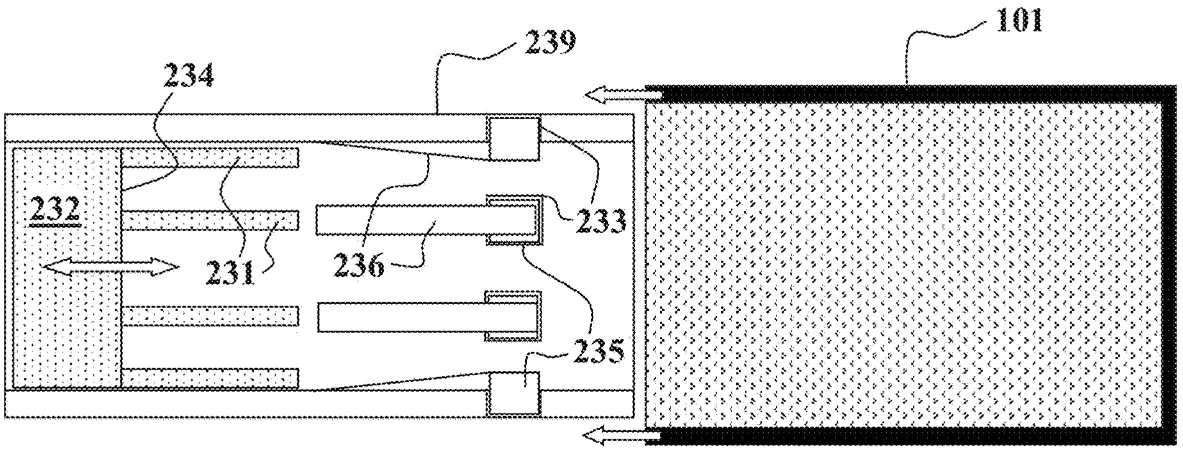

FIGS. 2A to 2D schematically illustrate a mandrel 239 (also referred to herein as a gripper) according to some possible embodiments, utilizing movable immobilizing elements 235 (also referred to herein as contact pads e.g., made of rubber) configured to grip and immobilize hollow cylindrical objects 101 having different inner diameters. With reference to FIG. 2A, the mandrel 239 comprises a cylindrical hollow body comprising a plurality of openings 233, circularly arranged spaced apparat along a circumference thereof i.e., forming a ring of openings in the mandrel. As better seen in FIG. 2B, a plurality of discrete friction imparting elements 235 are disposed in (or beneath) a respective one of the plurality of the plurality of openings 233, configured for being radially and reversibly pushed through their respective openings 233. An actuator assembly 232 mounted inside the mandrel 239 is configured to controllably and concurrently eject the friction imparting elements 235 through their respective openings 233.

In this specific and non-limiting example the friction imparting elements 235 are movably attached to the inner wall of the mandrel by an elastic, or resilient, element 236 (e.g., a flat elongated return/pressure/leaf spring) configured to position each friction imparting element 235 beneath, or slightly inside, its respective opening 233, in a rest state. The actuator assembly 232 comprises a base section 234 configured to axially slide inside the mandrel 239 along its length e.g., by using electrical motor(s) and suitable transmission mechanism (not shown), and a plurality pushing arm 231 axially extending from the base section 234 towards the openings 233.

Figure 2C:
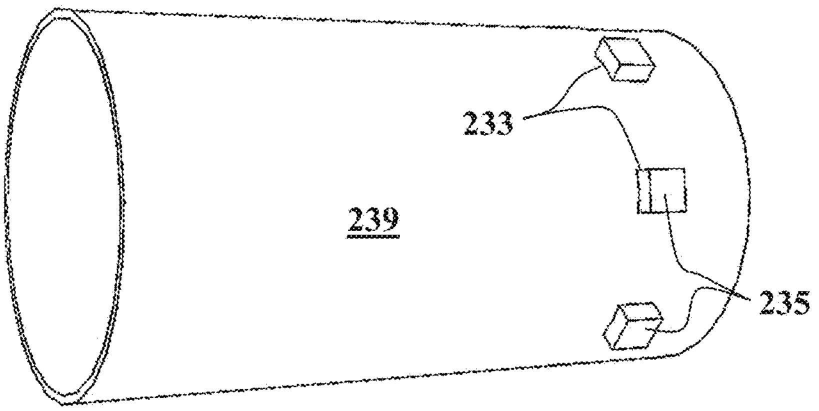

For each friction imparting element 235 of the mandrel there is a respective pushing arm 231 in the actuator assembly 232. This way, whenever an object 101 is placed over the mandrel 239 for process treatment (e.g., for printing thereon), the actuator 232 is moved axially towards the openings 233, such that each pushing arm 231 contacts and slide over a respective one of the elastic elements 236 and press it against/towards the inner wall of the mandrel, thereby causing the elastic element 236 to radially push the friction imparting element 235 attached thereto outwardly through its respective opening 233, as illustrated in FIG. 2C.

Figure 2D:
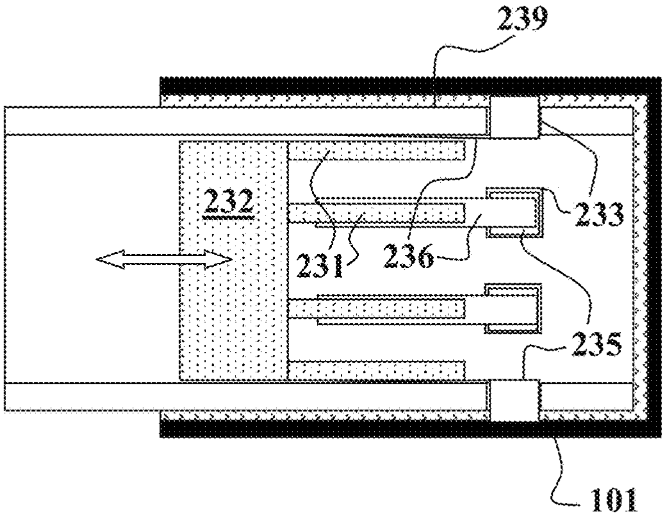

As shown in FIG. 2D, in the pressed state of the elastic elements 236, anterior portion of each friction imparting element 235 protrudes outwardly through the respective opening 233 for contacting discrete inner surfaces of the object 101, and thereby gripping and immobilize the object 101 over the mandrel 239. When it is needed to remove the object 101 from the mandrel 239, the actuator 232 is moved in the opposite direction i.e., away from the openings 233, back to its retracted position (shown in FIG. 2B), thereby releasing the pressed elastic elements 236 to restore their rest states, causing the friction imparting elements 235 to radially retract inwardly through their respective openings 233, and releasing the grip over the object 101. In possible embodiments a movable pushing ring or piston can be used instead of the pushing arm 231 to concurrently press all of the elastic elements 236 for applying the gripping forces thereon by the friction imparting elements 235.

Figure 3A:
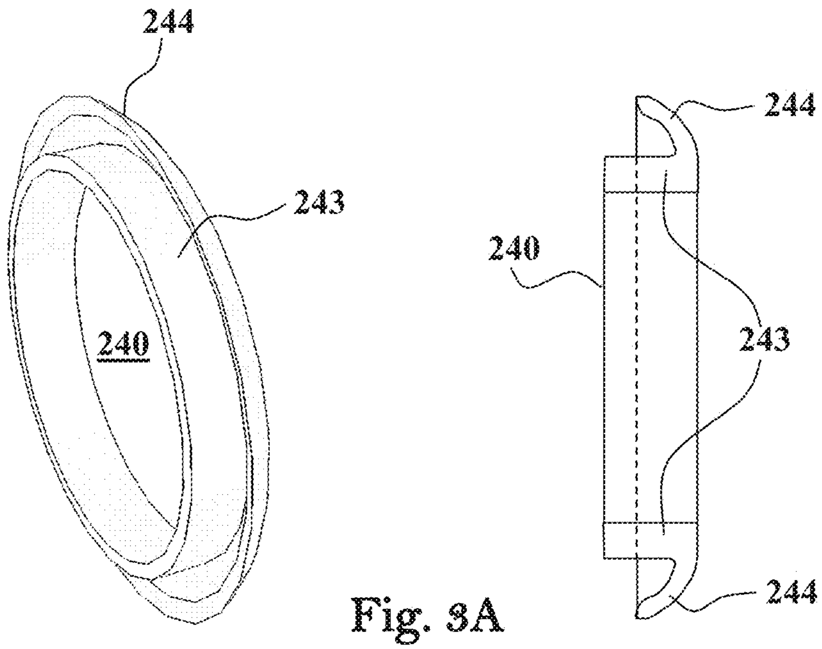
Figure 3B:
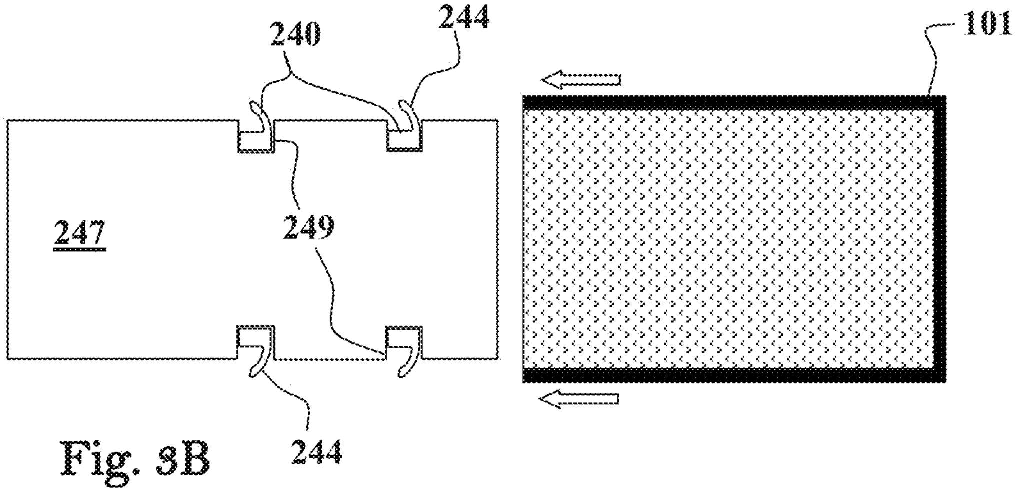
Figure 3C:
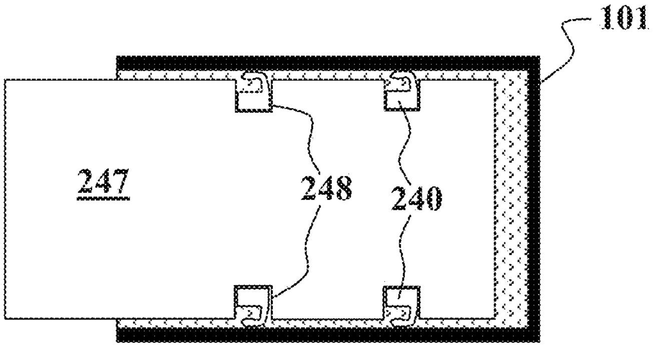

FIGS. 3A to 3C schematically illustrate a mandrel 247 (also referred to herein a gripper) utilizing, according to some possible embodiments, a ring-shaped flexible/elastic friction imparting element 240 configured to grip and immobilize hollow cylindrical objects 101 having different inner diameters. As shown in FIG. 3B, the mandrel 247 comprises a cylindrical body having one or more circumferential grooves 249 formed on its outer surface, and one or more-ring shaped flexible friction imparting elements 240 placed inside the grooves, and configured to contact circular inner surfaces of an object 101 placed over the mandrel 247, and immobilize it thereover.

As shown in FIG. 3A, the ring-shaped friction imparting element 240 comprises a circular base 243 section configured to snugly fit inside the circumferential groove 249 of the mandrel 247, and a bendable/elastic circular skirt section 244 (e.g., made of rubber) anteriorly extending from the circular base section 243. As seen in FIG. 3B the bendable circular skirt section 244 is configured to movably protrude outwardly through the circumferential groove 249 above the external surface of the mandrel 247, and as seen in FIG. 3C, it is reversibly pushed inwardly towards the circumferential groove 249 when pressed by the inner surface of the object 101 placed over the mandrel 247. In this state the bended circular skirt section 244 is pressed against a circular inner surface of the object 101, thereby gripping and immobilizing the object 101 placed over the mandrel 247. The grip power exerted by the bendable skirt 244 is configured to facilitate removal of the object by simply sliding it axially against the friction imparted by bendable skirt 244 over the internal wall of the object 101.

The mandrel 247 comprises in some embodiments a pressure release mechanism (not shown) for facilitating placement of the object thereover. For example, and without being limiting, the mandrel may comprise channels axially passing along a length of the mandrel for preventing pressure buildup as the object 101 is advanced thereover. Alternatively, or additionally, the mandrel 247 can comprise an internal conduit passing thereinside and communicating with the volume of the object 101 and/or the volume between external surface of the mandrel 247 and the inner wall of the of the placed object 101.

The mandrel 247 may be also configured to hold the object 101 placed thereover by an auxiliary mechanism (not shown). For example, and without being limiting, a vacuum pump may be used to apply vacuum conditions inside the volume of the object 101 and/or the volume between the external surface of the mandrel 247 and the inner wall of the placed object 101. Alternatively, or additionally, the bendable skirt section 244 of the flexible/elastic friction imparting element 240 may have magnetic properties capable of applying retaining forces over the object 101 placed thereover. Yet additionally, or alternatively, the outer surface of the bendable skirt section 244 of the flexible/elastic friction imparting element 240 may be treated to enhance the friction it can apply over the internal wall of the object 101 placed over the mandrel 247.

Figure 4A:
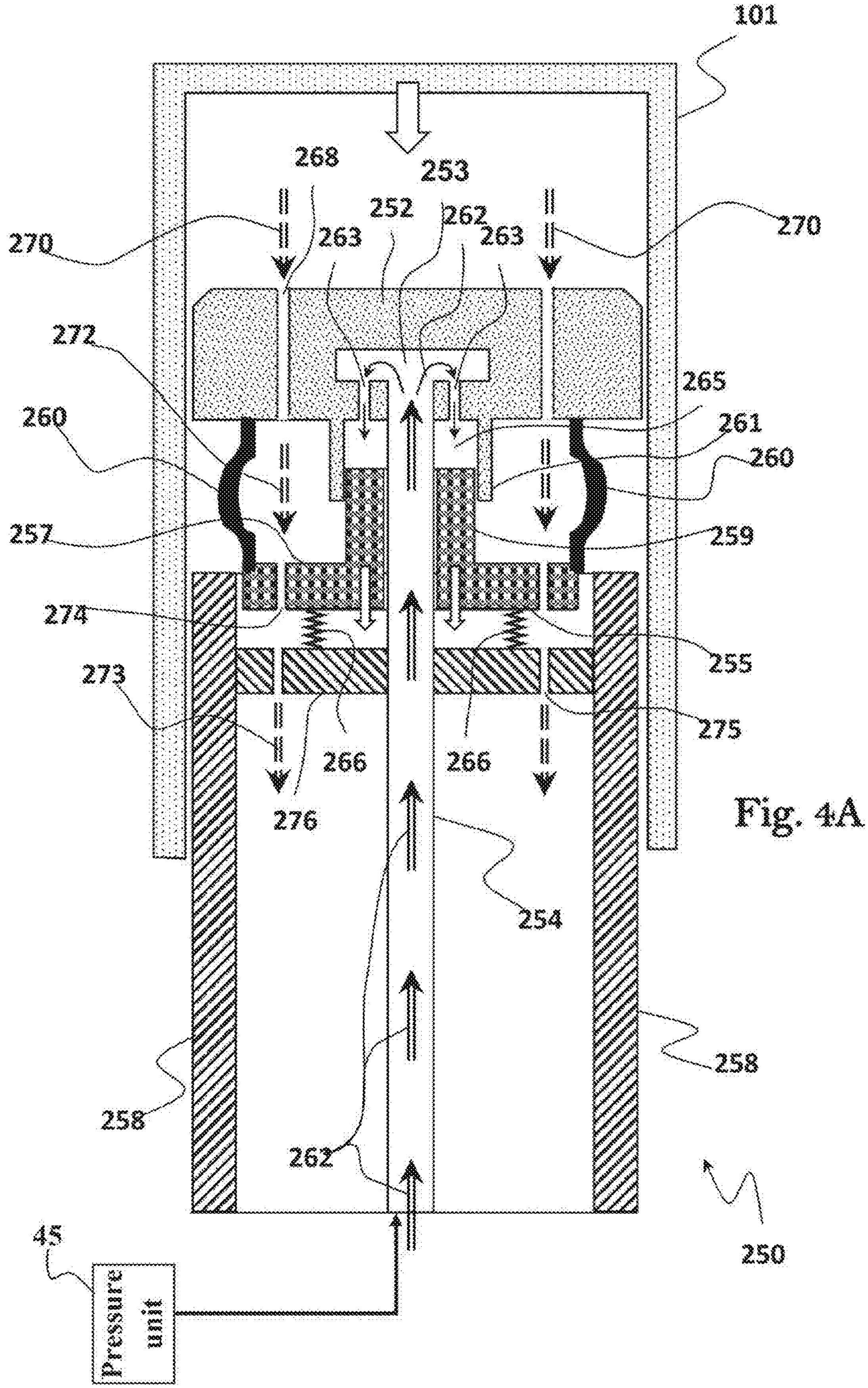
FIGS. 4A to 4C schematically illustrate a mandrel (also referred to herein as a gripper) configuration of some possible embodiments utilizing a deformable (flexible/elastic) friction imparting element to grip objects when the deformable element is compressed, wherein FIG. 4A show sectional view of the mandrel during placement of an object thereover, FIG. 4B show a sectional view of the mandrel after gripping an object placed thereover, and FIG. 4C show sectional view of the mandrel during removal of the object therefrom.
Figure 4B:
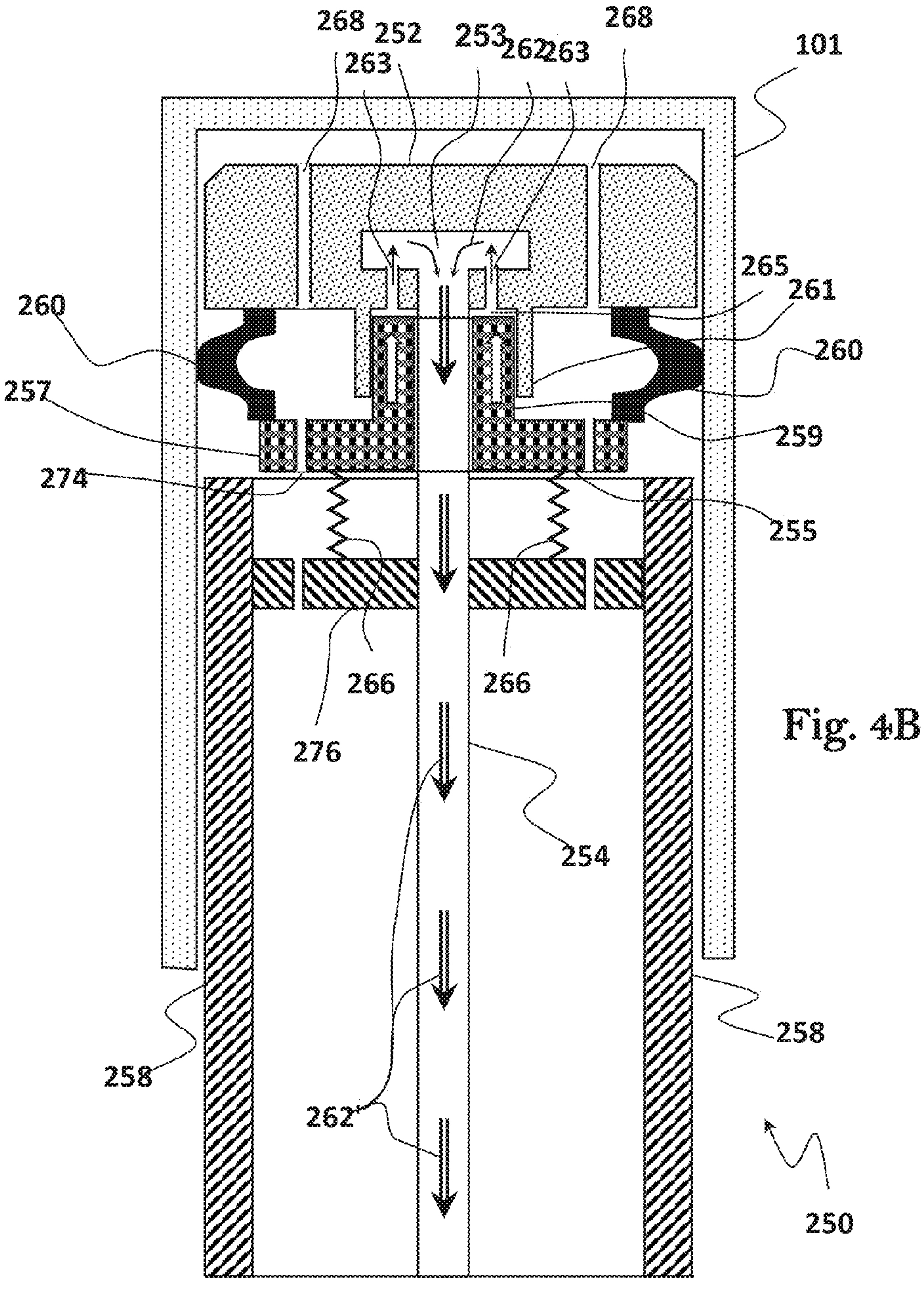

FIGS. 4A to 4B schematically illustrate a mandrel 250 (also referred to herein as a gripper) configuration of some possible embodiments utilizing a deformable flexible/elastic friction imparting element 260 configured to grip objects 101 when the deformable element 260 is longitudinally compressed, and show sectional views of the mandrel 250 before and after placing an object 101 thereover, respectively.

The gripper 250 includes a cap element 252, a central longitudinal hollow channel/tube 254 passing along a central elongated axis of the mandrel 250, a piston arrangement 257 sealably encircling the tube 254 and configured to axially slide thereover, and an elongated sleeve 258 coaxially attached to the tube 254 by one or more support elements 276. The piston arrangement 257 comprises a generally disc-shaped base element 255 and a tubular/cylindrical piston element 259 distally and coaxially extending from base element 255, and sealably mounted to slide over the tube 254. The cap element 252 comprises a cylindrical barrel 261 projecting proximally from a bottom side thereof, coaxially encircling the central tube 254, and configured to sealably accommodate the tubular piston element 259. The deformable element 260 is generally a tubular element coaxially surrounding the tube 254 and having, a distal rim attached to a bottom part of the cap 252, and a proximal rim attached to the base element 255 of the piston arrangement 257.

The connections and interactions of such elements between each other give rise to two states of the mandrel 250: an extended state, in which the deformable element 260 is substantially stretched longitudinally, as seen in FIG. 4A, and a pressed state, in which the deformable element 260 is substantially compressed, as illustrated in FIG. 4B. The object 101 is slid over the gripper 250 by changing the mandrel 250 into its extended state, wherein the deformable element 260 is longitudinally stretched, and is held by the gripper by changing the mandrel 250 into its pressed state, wherein the deformable element 260 is compressed and thereby protrudes radially over an outermost lip of the cap 252 and sleeve 258 elements to contact and apply radial pressure over an inner wall of the object 101.

As will be described hereinafter, the mandrel 250 is a normally pressed/gripping mandrel configured to change into its extended/non-gripping (object release) state by application of fluid pressure (e.g., air or any other gaseous pressure). In the extended state shown in FIG. 4A, a pressured fluid 262 (which may be air, steam, or any other fluid) is supplied by pressure unit 45 and made to flow through the hollow channel 254, from a proximal section of the channel to a distal section thereof, as indicated by the direction of the arrows 262. The fluid flow 262 exit through a distal opening of the tube 254 into a fluid chamber 253 formed in the cap element 252, which closes the channel 254 at a distal end thereof. The fluid flow 262 is then redirected in a second direction from the fluid chamber 253 of the cap 252 via one or more fluid passages 263 formed in the cap element into a pressure chamber 265 formed in the cylindrical barrel 261 and sealably closed by the piston 259. The pressure conditions evolving inside the pressure chamber 265 by the fluid flow 262 pushes the piston 259 in the second direction and causes the piston arrangement 257 to move in the second direction (proximally).

The deformable element 260 can be an elastic (or resilient) element configured to naturally restore a compressed state thereof, in which a circumferential section thereof protrudes radially above the surface of the gripper/mandrel for attaching an object placed over the gripper/mandrel thereto. In this configuration the piston arrangement 257 can be configured to move proximally under the fluid pressure inside the pressure chamber 265 against forces applied by the normally compressed deformable element 260, for stretching the deformable element 260 and changing the gripper/mandrel into its non-gripping state. Accordingly, whenever the fluid pressure inside the pressure chamber 265 is removed, or reduced below a certain threshold pressure level, the elasticity of the deformable element 260 will pull the piston arrangement proximally, as it restores back into its compressed state, thereby expelling fluid/air from the pressure chamber 265 and changing the gripper/mandrel back into its pressed/gripping state.

Optionally, and in some embodiments preferably, a resistive/elastic element 266, such as a spring, coupled to the base 255 of the piston arrangement 257, is configured to at least partially resist the motion of the piston arrangement 257 in the second direction by applying a force on the piston arrangement 257 in the first direction. The resistive/elastic element 266 can be connected on one side thereof to the base 255 of the piston arrangement 257, and on the other side thereof to the distalmost support element 276. As the deformable element 260 is connected by a proximal end thereof to the base 255 of the piston arrangement 257, and by a distal end thereof to the cap element 252, as the piston arrangement 257 moves away from the cap element 252, the deformable element 260 stretches longitudinally, and allows placing the object 101 over the gripper 250 by sliding it proximally along the outer walls of the gripper 250.

In order to change the gripper 250 into its pressed state, shown in FIG. 4B, the fluid flow 262 from the pressure unit 45 towards the cap element 252 is stopped, such that resistive/elastic element 266 pushes the piston arrangement 257 distally in the first direction, thereby discharging fluid material from the pressure chamber 265 and causing fluid flow 262' in a reversed direction i.e., away from the cap element 252. In this manner, the piston arrangement 257 slides distally over the tube 254 toward the cap element 252, and thereby the deformable element 260 becomes compressed. When compressed, the deformable element 260 is configured to extend radially over the outermost lips of the sleeve 258 and the cap 252 elements. In this compressed state, the deformable element 260 comes into contact with, and circumferentially pressed against, the inner wall of the object 101, thereby applying radial pressure over the inner wall of the object 101. Via this pressure, the gripper 250 grips the object 101.

Optionally, the cap element 252 is a dome shaped element. In some embodiments, the cap element 252 includes at least one perforation 268 for enabling passage of air expelled from the inside of the object 101 into a region between the sleeve 258 and the channel 254, during placement of the object 101 over the mandrel, as shown by the arrows 270 and 272. This feature makes it easier for the object to be slid quickly over the gripper since air can be quickly discharged while sliding the object 101 on the mandrel 250. Otherwise, the air trapped inside the object 101 between the cap element 252 and the distal inner wall of the object 101 would be compressed as the distal inner wall of the object 101 approaches the cap element 252 of the object 101, and would buildup resistive pressure against the motion of the object toward the gripper.

Optionally, and in some embodiments preferably, the base element 252 of the piston arrangement 257 also includes one or more perforations 274, and/or one or more second perforations 275 are also formed in the support element(s) 276 to allow the air expelled from the inside of the object 101 to further advance along the second direction toward the proximal end of the gripper, between the channel 254 and the sleeve 258. Optionally, the region between the channel/tube 254 and the sleeve 258 at the proximal end of the gripper 250 is hollow and open. In this manner, the air from the inside of the object 101 can be channeled to the proximal end of the gripper and be released into open air/external environment.

In some embodiments the gripper 250 is elongated with a cylindrical surface. The deformable element 260 may comprise a single element looping around the gripper, or may include many elements located at predefined positions along a sectional circumference of the gripper. Optionally the piston arrangement 257 is a loop surrounding the hollow channel 254. The elastic element 266 may comprise one or more resistive elements (e.g., springs) or may be a single resistive element, for example a single spring looping around/encircling the hollow channel 254. The resistive/elastic element 266 can be thus disposed between the base 255 of the piston arrangement 257 and the support element 276, not necessarily attached thereto.

Figure 4C:
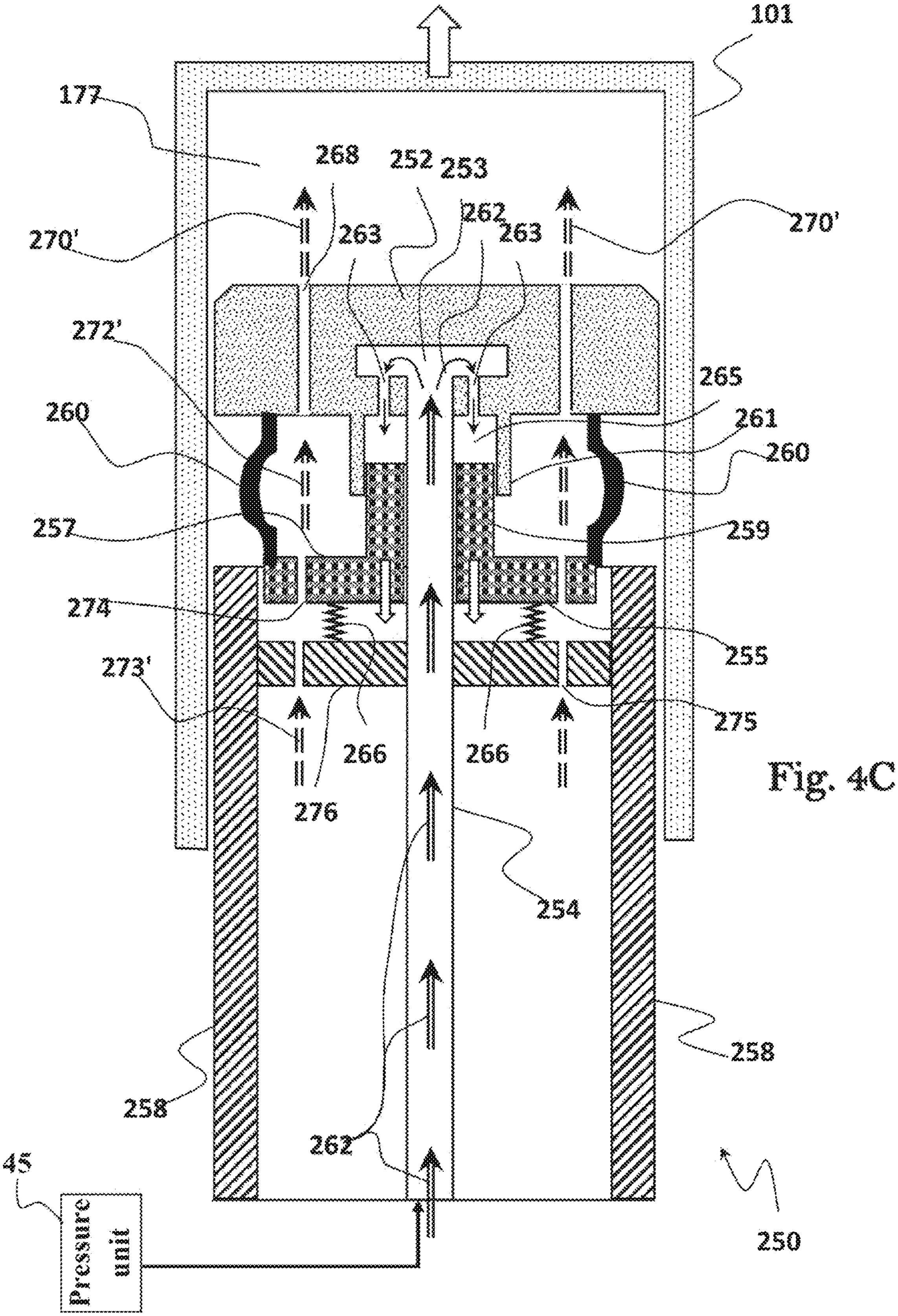

FIG. 4C shows the mandrel 250 during removal of the object 101 therefrom. As seen, fluid material is flowed (262) distally by the pressure unit 45 through the central tube 254 into fluid chamber 253, and therefrom into the pressure chamber 263, to press the piston element 259 and cause the piston arrangement 257 to proximally slide over the tube 254 against the resistive power exerted by the resistive/elastic element 266. The pressure fluid applied thus causes the deformable element 260 to longitudinally stretch, release the grip over the internal wall of the object 101, and thereby change into the extended (release/non-gripping) state of the mandrel 250. The object 101 is then distally slid over the mandrel 250, thereby streaming air from the external environment through one or more of the perforations 275, 274, and/or 268, into the gradually increasing internal volume 177 between the cap element 252 and the internal distal wall of the object 101. This way resistive vacuum pressures are substantially prevented for guaranteeing easy and smooth removal of the object 101 from the mandrel 250.

The mandrel 250 is further configured in some embodiments to rotate about its elongated axis, and thereby rotate the object place thereon. The different elements of the gripper 250 can be fabricated from any material suitable for the functionalities described above e.g., metals, plastics, glasses. The deformable element 260 can be manufactured from any suitable elastic/flexible material, such as, but not limited to, rubber.

Figure 5A:
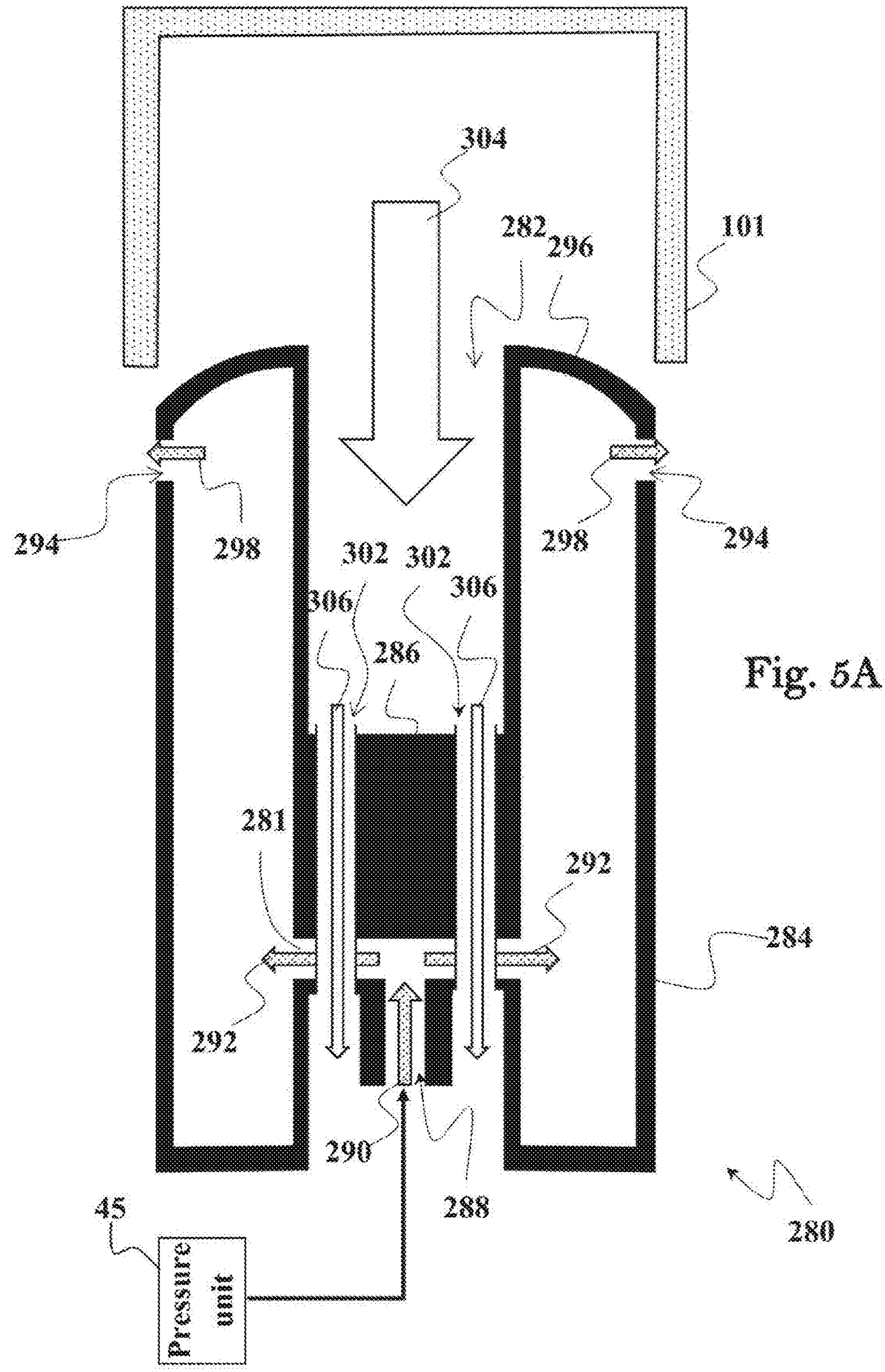
Figure 5B:
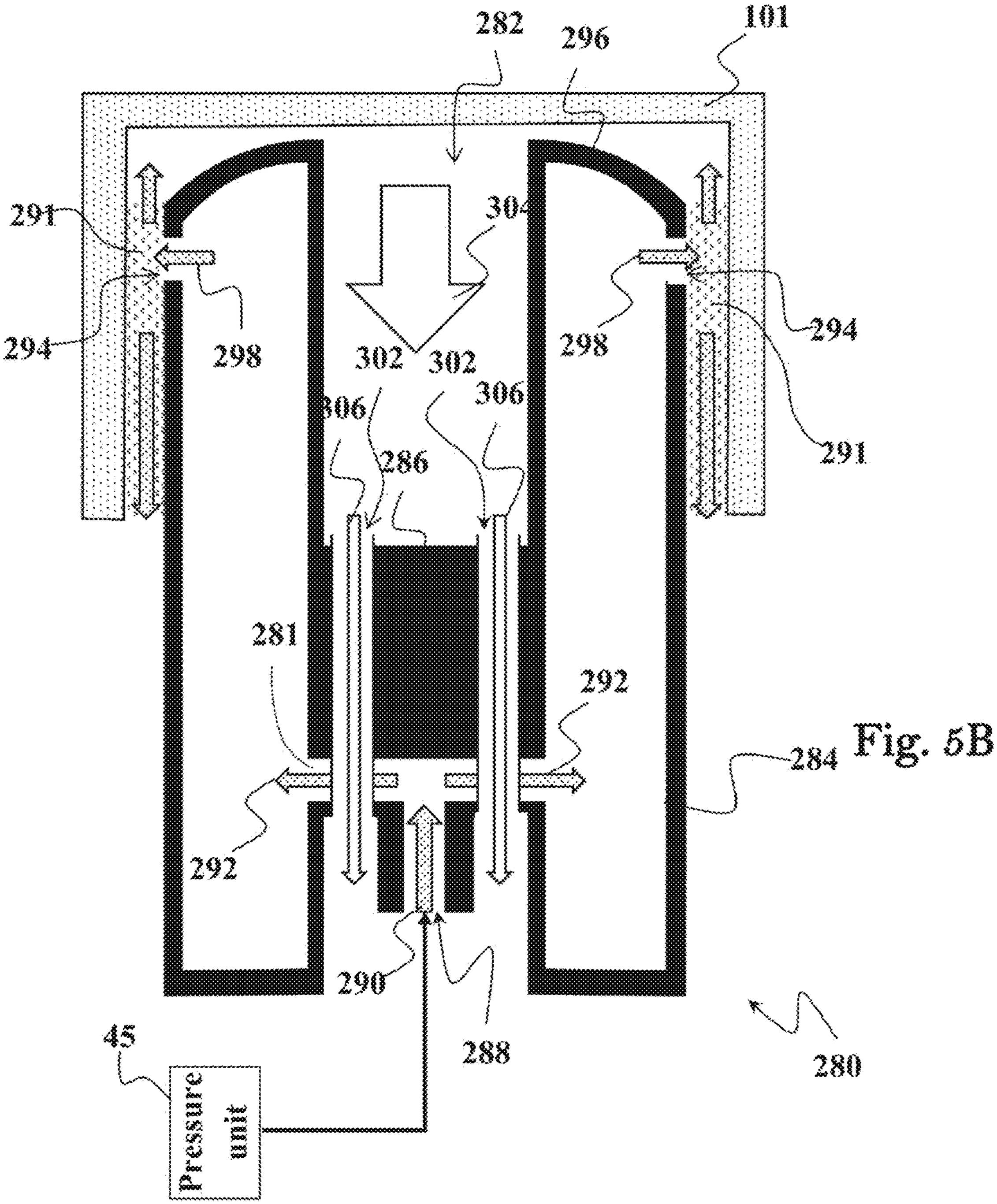
Figure 5C:
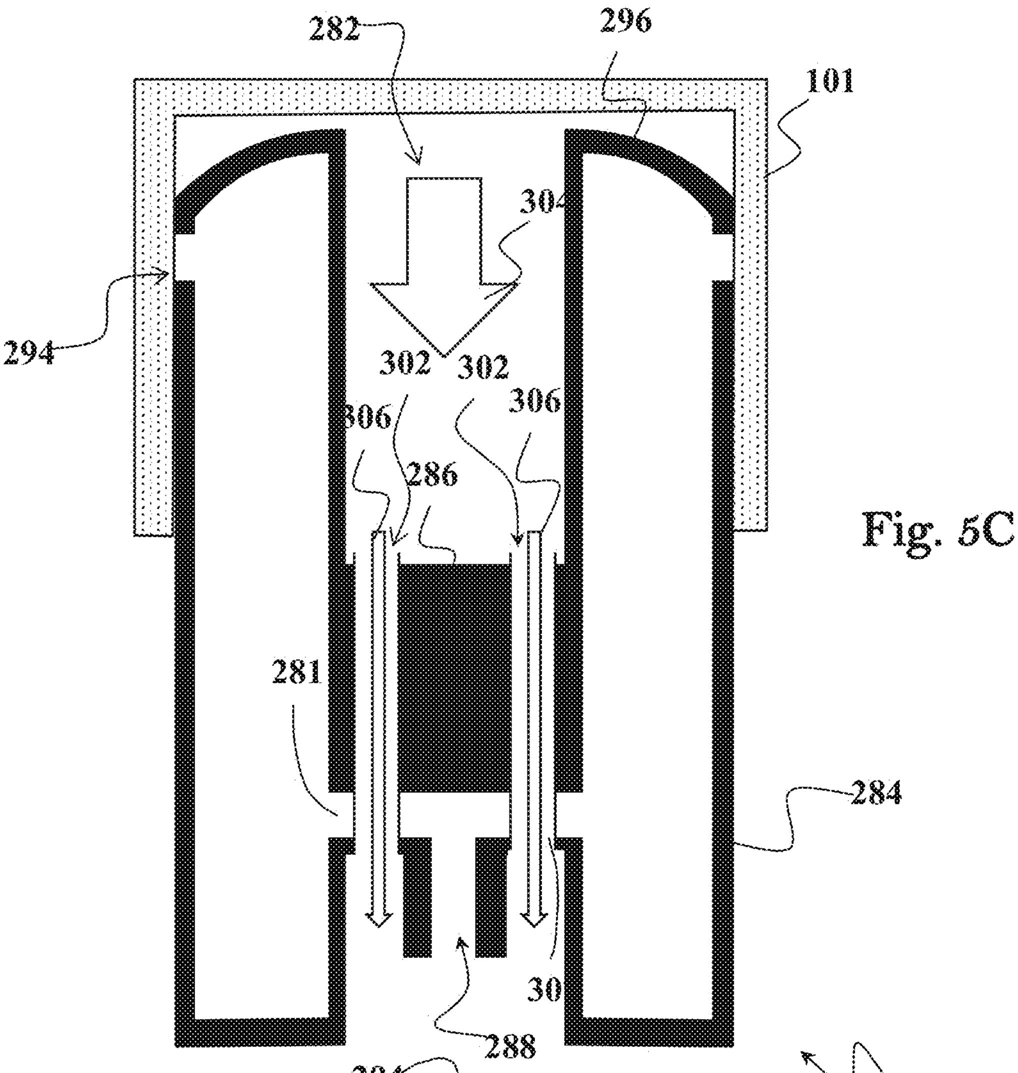

FIGS. 5A to 5C schematically illustrate a mandrel (also referred to herein as a gripper) configuration 280 of some possible embodiments utilizing an air flow configured for generating a buffering sleeve around the mandrel 280 for facilitating placement of an objects 101 thereover. Optionally, the mandrel 280 is configured to at least partially inflate the object 101. FIGS. 5A and 5B show sectional views of the mandrel 280 while fluid/air pressure is on and the object 101 is slid onto the mandrel 280, and FIG. 5C shows a sectional view of the mandrel 280 after air pressure has been decreased and inner wall surfaces of the object contacts and adheres to the mandrel 280.

The gripper 280 includes an elongated hollow channel 282 traversing the gripper along a central axis of the mandrel 280, an elongated fluid chamber/sleeve 284 surrounding the hollow channel 282 or at least part of it, and a hub arrangement 286 located at least partially inside the hollow channel 282, and being configured for plugging the hollow channel 282.

The hub 286 has at least one inlet conduit/tube 288 configured for receiving pressured fluid/air from the pressure unit 45, and at least one fluid channel 281 communicating between the inlet conduit/tube 288 and the elongated chamber/sleeve 284 for directing the pressured fluid/air into the fluid chamber 284. The flow of pressured fluid/air into the hub 286 is denoted by the arrowed line 290, and the flow of pressured fluid/air through the conduit/tube 288 and into the fluid chamber 284 is denoted by the arrowed lines 292.

The fluid chamber 284 has at least one outlet opening 294 for releasing fluid/air from the fluid chamber 284. The outlet opening 294 is located in some embodiments in a vicinity of a distal end 296 of the fluid chamber 284. Optionally, and in some embodiments preferably, the mandrel 280 comprises a plurality of outlet opening 294 circumferentially distributed over at least one circumferential section of the mandrel 280, and configured to stream pressured fluid/air therefrom in radial directions.

As shown in FIG. 5B, with this configuration, when the object 101 is slid over the gripper 280 and pressured fluid/air is streamed out from the fluid chamber 284 via its outlet openings 294, a buffering fluid/air sleeve 291 is generated between the outer surface of the gripper 280 and inner walls of the object 101 by the fluid/air released by the openings 294, almost as soon as the object 101 meets the gripper. The buffering fluid/air sleeve 291 at least partially inflates portions of the object 101 as it is progressively slid over the mandrel 280. Optionally, the distal end of the chamber has a tapering shape. In this manner, the object 101 can be easily slid onto the distal end of the gripper before being inflated.

In this way, during the placement of the objects 101 over the mandrels 280 the objects 101 are "floating" over the mandrels, since the formation of the buffering fluid/air sleeve 291 provide for a contactless placement procedure. Thus, the objects 101 are slid over the mandrels 280 substantially without, or with negligibly small, resistive friction forces.

The pressured fluid/air flow released by the opening 294 is denoted by the arrows 298. The object 101 is at least partially inflatable by the air flow at the opening 294, as seen in FIG. 5B. As the object 101 is pushed further onto the gripper 280, an air cushion 291 is created by the air flow 298 between the gripper and the object 101.

The fluid/air flow into the hub arrangement 286 (and therefore the air flow out of the fluid chamber 284) is controllable. As shown in FIG. 5C, as soon as the object 101 has been slid onto the gripper 280 by a desirable distance (e.g., when the cap of the object 101 contacts the distal end 296 of the chamber 284), the fluid/air flow from the pressure unit 45 into the hub arrangement 286 is decreased or stopped altogether. In this manner, the fluid/air flow out of the chamber 284 is also lowered or stopped, and the air cushion 291 disappears. Therefore the object 101 deflates and adheres to the gripper 280. In this manner, the gripper 280 is able to grip the partially inflatable object 101.

In some embodiments of the present invention, the fluid chamber 284 has two or more openings (for example, three, four, or eight) being disposed so as to create the air cushion symmetrically with respect to the central axis of the gripper 280.

Optionally, and in some embodiments preferably, the hub arrangement 286 includes at least one air passage 302 passing along its length and configured for receiving an air flow 304 pushed by the object 101 into the distal side of hollow channel 282 as the object 101 is slid along the gripper 280, and for allowing the pushed air to exit the hollow channel 282 from a proximal side of hollow channel. In this manner, the pressure created by the air flow 304 into the hollow channel is released, as seen by the air flow 306 through the one or more passages 302. This release eases the sliding of the object 101 onto the gripper 280 and prevents buildup of resistive pressure inside the object 101.

Figure 5D:
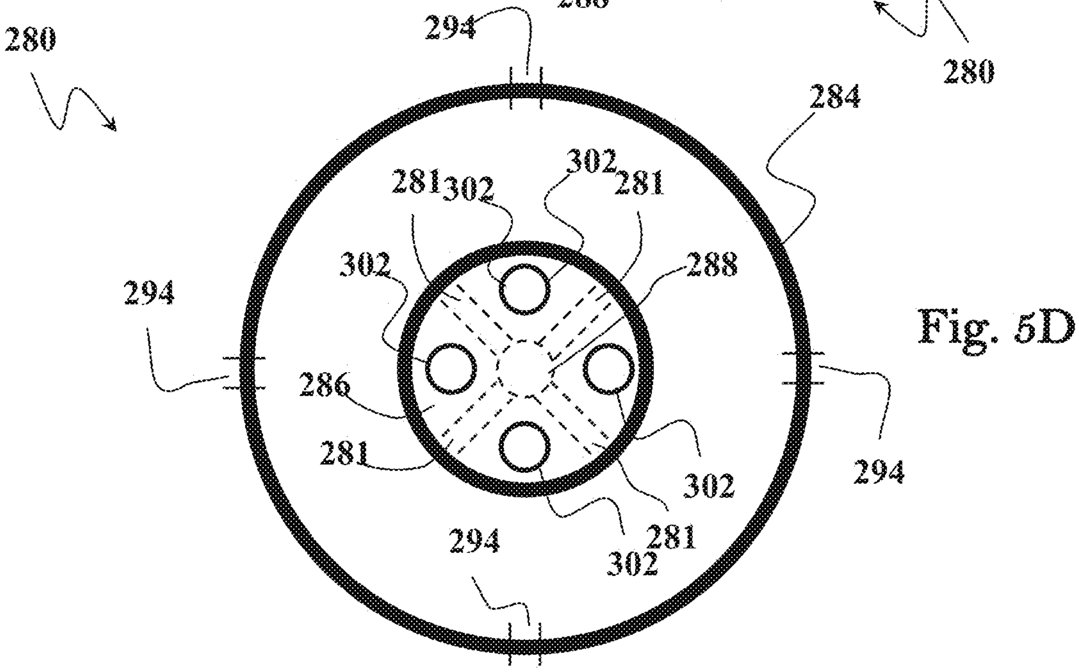

In some embodiments the gripper 280 is elongated along its central axis. Optionally, and in some embodiments preferably, the gripper 280 has a circular cross section. FIG. 5D shows a top view of the mandrel 280 according to a possible embodiment. In this specific and no limiting example hub arrangement 286 comprises four air passages 302 passing along its length, and four fluid channels 281 radially extending from the inlet conduit/tube 288. However, is some embodiments greater, or smaller, number of air passages 302, and/or greater, or smaller, number of fluid channels 281, can be used.

In FIG. 5D each one of the fluid channels 281 is radially extending from the inlet conduit/tube 288 is a section of the hub located between two respective air passages 302, but different arrangement can be similarly employed. Additionally, although four outlet openings 294 are shown in FIG. 5D, greater, or smaller, number of outlet openings 294 can be similarly provided in different embodiments.

Figure 6A:
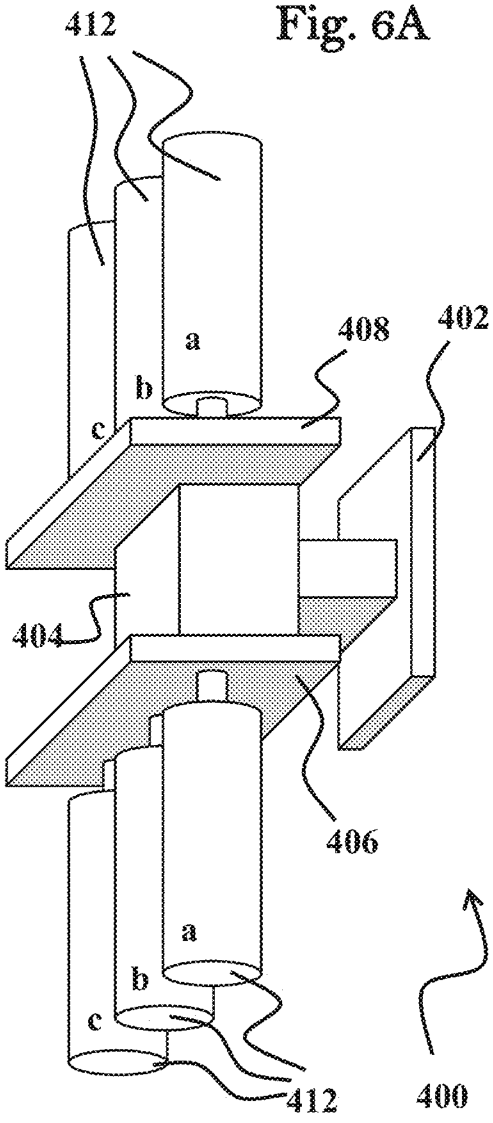
FIGS. 6A and 6B schematically illustrate a carriage system configured for carrying and moving two or more arrays of object grippers/mandrels, where each array of grippers is implemented by a detachable and replaceable wing of grippers.
Figure 6B:
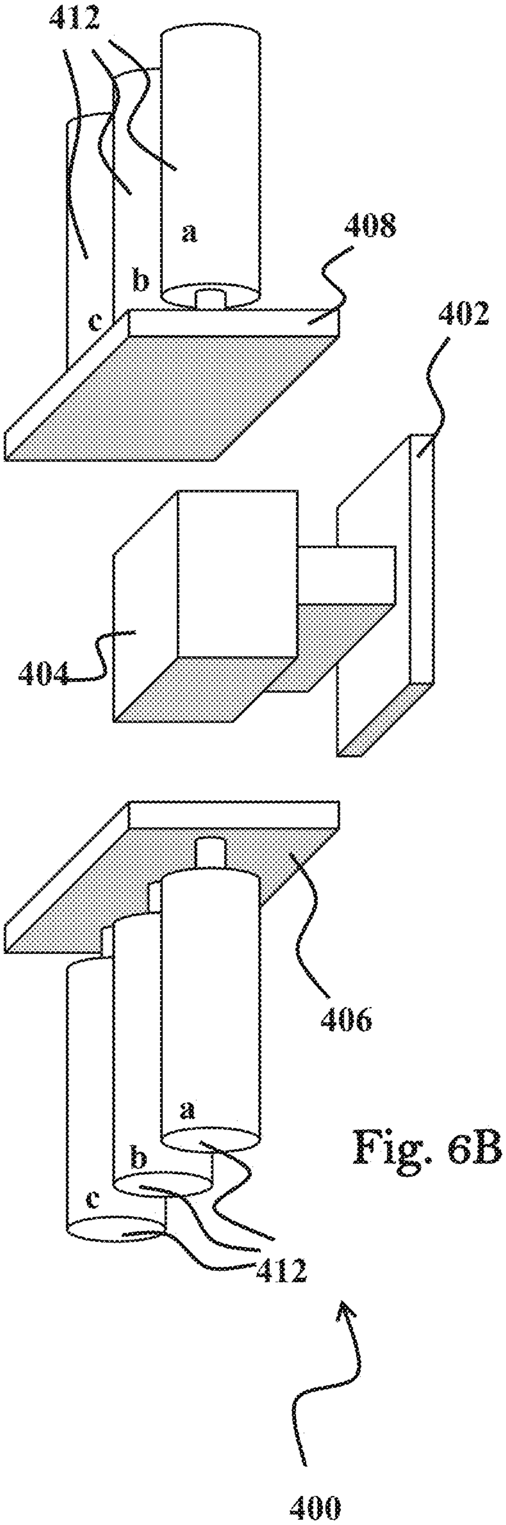

FIGS. 6A and 6B schematically illustrate a carriage system (also referred to herein as support platform) 400 configured for carrying and moving one or more arrays of mandrels 412. The mandrels 412 can be implemented in form of any of the mandrel embodiments disclosed herein, and/or in international publication No. WO 2015/177599. In this specific example, the support platform 400 comprising two arrays of mandrels 412, where each array of mandrels being arranged as a wing of mandrels, and each wing of mandrels 412 being detachable and replaceable.

The carriage system 400 includes a motor unit 404, a first wing of mandrels 406 and a second wing of mandrels 408. Each wing of mandrels further comprises in some embodiments mechanical elements (not shown e.g., axels, gear sprockets, and/or belts) configured to deliver rotary movement from the motor unit 404 to the mandrels (412). Optionally, and in some embodiments preferably, the carriage system 400 further includes a wagon 402 joined to the motor unit, for carrying all the above elements along a desired path. The path may be defined by a track, for example.

The motor unit 404 includes a first plurality of ports and a second plurality of ports (not shown), via which the motor unit 404 moves and operates each individual mandrel. The first and second plurality of ports are disposed on opposite sides of the motor. The first wing 406 is configured for joining the first set of mandrels 410 to the first plurality of ports, for enabling the motor unit 404 to move and operate the mandrels of the first set. Similarly, the second wing 408 is configured for joining the second set of mandrels 412 to the second plurality of ports, for enabling the motor to move and operate the mandrels of the second set.

The first wing 406 and the first set of mandrels 410 form a first apparatus are configured to be detachably joined to the motor unit 404. Similarly, the second wing 408 and the second set of mandrels 412 form a second apparatus configured to be detachably joined to the motor unit 404. This is shown in FIG. 6B. In this manner, a plurality of mandrels (for example, 24 mandrels joined to the same wing) can be quickly replaced together as a block whenever arrays of objects having a different (either smaller or greater) internal diameter need to be carried by the carriage system 400. In the non-limiting example shown in FIGS. 6A and 6B, each wing 406/408 comprises three mandrels 412*a*, 412*b* and 412*c*, but of course, each wing can be configured to have a greater, or a smaller, number of mandrels 412.

The quickness of object replacement, which can be achieved with this setup, enables faster throughput in treating/printing the objects. In this manner, when the treating/printing of the first arrays of objects is completed, the wings 406/408 with the mandrels of the first objects can be quickly detached from the motor unit 404 and the new wings for the new arrays of objects can be quickly joined to the motor unit 404. This process reduces the waiting time that would occur is each mandrel had to be detached individually from the motor unit or if each object had to be replaced individually onto mandrels that are not detachable.

In some embodiments the motor unit 404 comprises a single motor, and mechanical transmission components (not shown), configured to transfer rotary motion generated by the motor to the mandrels 412. Alternatively, in some embodiments the motor unit 404 comprises a respective single motor, and respective mechanical transmission components (not shown), configured to transfer rotary motion generated by the motor to a respective mandrel 412 i.e., each mandrel is rotated by a respective motor. The motor(s) used in the motor unit 404 is an electric motor, or any other suitable motor capable of controllably producing rotary motion.

Optionally, and in some embodiments preferably, the wings of mandrels, 406 and 408, are configured to attach to the carriage system 400 two parallel rows of mandrels 412 directed in opposite directions i.e., one row of mandrels being parallel and in the direction movement of the carriage, and the other row of mandrels being parallel and in a direction opposite to the carriage's movement direction. In such configurations the motor unit 404 can have a respective motor, and mechanical transmission components (not shown), mechanically coupled to each pair of mandrels belonging to the different wings 406 and 408 and that are adjacently located to each other i.e., the pair of mandrels 412*a*, 412*b* and 412*c*, in same column.

Figure 7A:
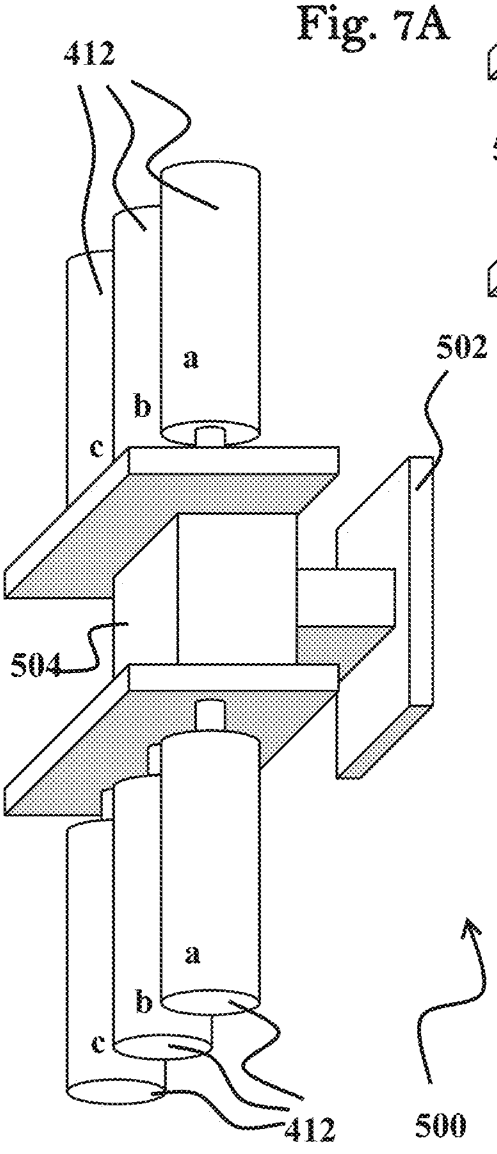
FIGS. 7A and 7B schematically illustrate a modular carriage system configured for carrying and moving two or more arrays of object grippers/mandrels, where the system comprising a detachable and replaceable block of object grippers/mandrels, and a detachable and replaceable block of motors.
Figure 7B:
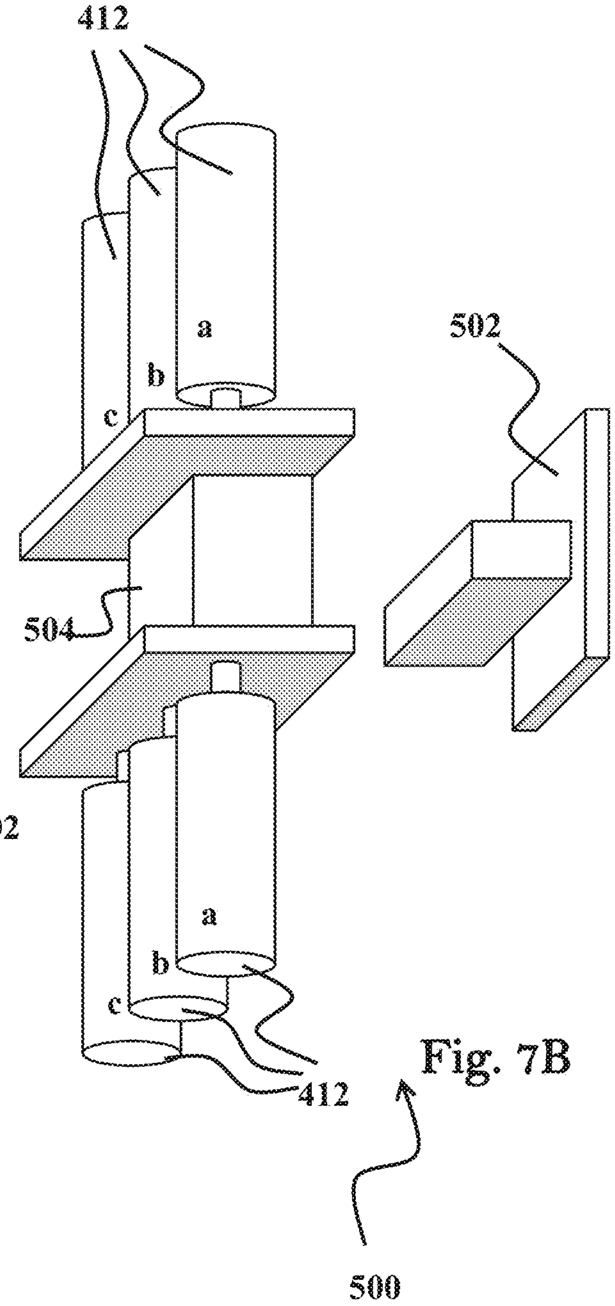

FIGS. 7A and 7B schematically illustrate a carriage system 500 for carrying and moving mandrels 412, the apparatus comprising a block comprising the mandrels 412 and a motor unit 504, the block being detachable and replaceable from a carriage/support platform 502 configured to move carriage system 500 along a lane for treating objects carried by the mandrels.

The carriage system 500 is very similar to the system 400 described above with reference FIGS. 6A and 6B. However, in the system 500, the motor unit 504 is detachable from the wagon 502 as shown in FIG. 7B. The mandrels 412 are detachably or undetachably attached to the motor unit 504. Therefore, rather than replacing one wing at a time, the motor unit 504 and all the mandrels 510 joined to the motor unit can be detached from the wagon together. The motor unit 504 can have a single motor, and mechanical transmission components (not shown), configured to transfer rotary movement generated by the motor to the mandrels. Alternatively, the motor unit 504 can have a respective motor, and mechanical transmission components (not shown), for transferring the rotary motion of the motor to a respective mandrel 412.

Optionally, and in some embodiments preferably, motor unit 504 comprises a respective motor, and mechanical transmission components (not shown), configured to transfer the rotary motion generated by the motor to a respective pair of mandrels 412*a*, 412*b*, 412*c*, adjacently located to each other and belonging to different rows of mandrels.

One advantage of this configuration is that each of the mandrels do not need to be removed at all from the motor unit, and this may lengthen the lifetime of each mandrel. Another advantage lies in the quickness of replacement and enhancement of the throughput of treating/printing on the objects, as all of the arrays of mandrels 412 of a carriage can be quickly removed and replaced in a single operation.

Figure 8A:
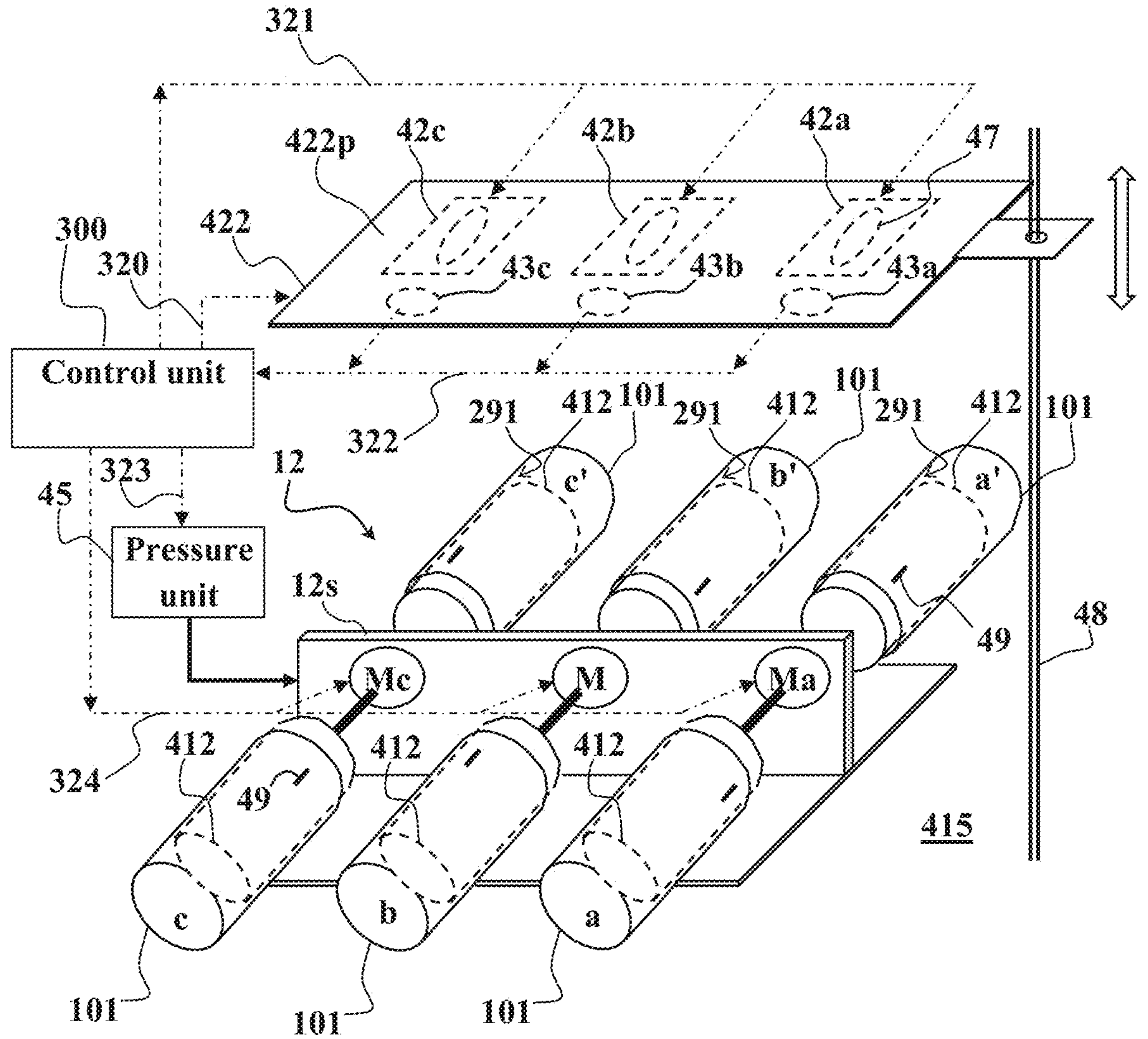

FIG. 8A schematically illustrates a registration setup 415 configured according to some embodiments to align angular orientation of objects 101 carried by the carriage system 12. The carriage system 12 in this specific and non-limiting example comprises two parallel rows of mandrels 412, each row comprising three mandrels, 412*a-c* and 412*a*'-c'. Each row of mandrels horizontally extends from a respective face of an elongated support member 12*s* of the carriage system 12, such that the front row of mandrels 412*a-c* extends from the support member 12*s* in a direction opposite to the direction the rear row of mandrels 412*a*'-c'.

In this example, each pair of adjacently located mandrels is mechanically coupled to a respective motor, Ma, Mb and Mc, configured to rotate the respective pair of mandrels 412*a-a*', 412*b-b*', and 412*c-c*', at the same direction and speed. The treatment process applied to the objects 101 can be simplified in this case by aligning each pair of objects placed on adjacently located mandrels 412 e.g., using an aligning/indexing mark 49. An alignment process can be thus used to align the mark 49 on object 101*a* with the mark 49 on object 101*a*', and similarly align object 101*b* with object 101*b*' and object 101*c* with object 101*c*'.

The mandrels 412 in this example are configured to generate a buffering fluid/air sleeve 291, as described with reference to FIGS. 5A to 5D, which is advantageously used to align the pairs of adjacently located objects 101*a*-101*a*', 101*b*-101*b*', and 101*c*-101*c*'. For this purpose the object immobilizing system 422 is used to immobilize the rear row objects 101*a*', 101*b*', and 101*c*', while the front row objects 101*a*, 101*b*, and 101*c*, are rotated until their marks 49 of the rear and front objects are aligned. The object immobilizing system 422 comprises an array of immobilizing units, 42*a*, 42*b*, and 42*c*, and a respective array of sensor units (e.g., utilizing imagers, such CCD or CMOS imagers), 43*a*, 43*b*, and 43*c*, mounted on a platform 422*p* configured to move along a vertical rail 48.

During the objects registration process the platform 422*p* is moved downwardly towards the carriage system 12 until each one of the immobilizing units, 42*a*, 42*b*, and 42*c*, is located in a vicinity of a respective one of the rear row objects, 101*a*', 101*b*', and 101*c*'. Pressured fluid/air is then streamed through the rear row mandrels, 412*a*', 412*b*', and 412*c*', by the pressure unit 45 to generate the fluid/air buffering sleeves 291 around the rear row mandrels and make each of the rear row objects, 101*a*', 101*b*', and 101*c*', "float" over its respective mandrel. The pressurized fluid/air is selectively supplied only to the rear row mandrels, 412*a*', 412*b*', and 412*c*', such that only the rear row objects, 101*a*', 101*b*', and 101*c*', are caused to "float" over their respective mandrel, while the front row objects, 101*a*, 101*b*, and 101*c*, remain attached over their respective front row mandrels, 412*a*, 412*b*, and 412*c*.

In this state the immobilizing units, 42*a*, 42*b*, and 42*c*, are activated to apply by each immobilizing unit attraction forces over the respective rear row object 101*a*', 101*b*', and 101*c*, positioned therebelow, and thereby hold it substantially immobilized. The sensor units, 43*a*, 43*b*, and 43*c*, are used to record the location of the mark 49 in each rear row object, 101*a*', 101*b*', and 101*c*', and the motors, Ma, Mb and Mc, are then activated to rotate the mandrels 412. Though all of the mandrels 412 are rotated, only the front row objects, 101*a*, 101*b*, and 101*c*, are rotated, as the rear row objects, 101*a*', 101*b*', and 101*c*', are immobilized due to the fluid/air buffering sleeves 291 formed around the rear row mandrels, 412*a*', 412*b*', and 412*c*', and the attraction forces applied by the immobilizing units, 42*a*, 42*b*, and 42*c*.

The sensor units, 43*a*, 43*b*, and 43*c*, monitor the movement of the marks 49 on the front row objects, 101*a*, 101*b*, and 101*c*, as they are being rotated, for stopping each of the motors, Ma, Mb and Mc, when identifying that the marks 49 of the respective front and rear objects thereby rotated are aligned i.e., motor Ma is stopped when the mark 49 on object 101*a* is aligned with the mark 49 on object 101*a*', motor Mb is stopped when the mark 49 on object 101*b* is aligned with the mark 49 on object 101*b*', and motor Mc is stopped when the mark 49 on object 101*c* is aligned with the mark 49 on object 101*c*'.

Optionally, and in some embodiments preferably, before activating the pressure unit 45 to form the fluid/air buffering sleeves 291 around the rear row mandrels the motors, Ma, Mb and Mc, are operated to rotate all the mandrels 412 for positioning the marks 49 on the rear row objects, 101*a*', 101*b*', and 101*c*', at a predefined angular location, to thereby put all of the rear row objects, 101*a*', 101*b*', and 101*c*', at the same angular position. The registration process can then proceed as described hereinabove and hereinbelow to align the marks 49 on the front row objects, 101*a*, 101*b*, and 101*c*, with the marks 49 on the rear row objects, 101*a*, 101*b*, and 101*c*. In this way, at the end of the registration process all of the objects 101 carried by the carriage system 12 are set into the same angular angle.

The marks 49 provided on the objects 101 can be implemented by any suitable marking techniques usable for adjusting the orientations of the objects. In some embodiments the marks 49 are optically detectable marks e.g., printed/painted marks, engraved marks, laser markers, and suchlike, but they may as well, or instead, comprise magnetically detectable marks, RF radiating marks, NMR detectable marks, and suchlike. The attraction forces applied by the immobilizing units, 42*a*, 42*b*, and 42*c*, can be implemented using suction/vacuum applicators, electromagnets, electric fields applicators, electrostatic forces applicators, or any combination thereof. Optionally, and in some embodiments preferably, each immobilizing unit comprises at least one suction aperture 47 pneumatically coupled to a vacuum source (not shown) configured to controllably apply and stop the attraction forces applied on the objects 101.

Figure 8B:
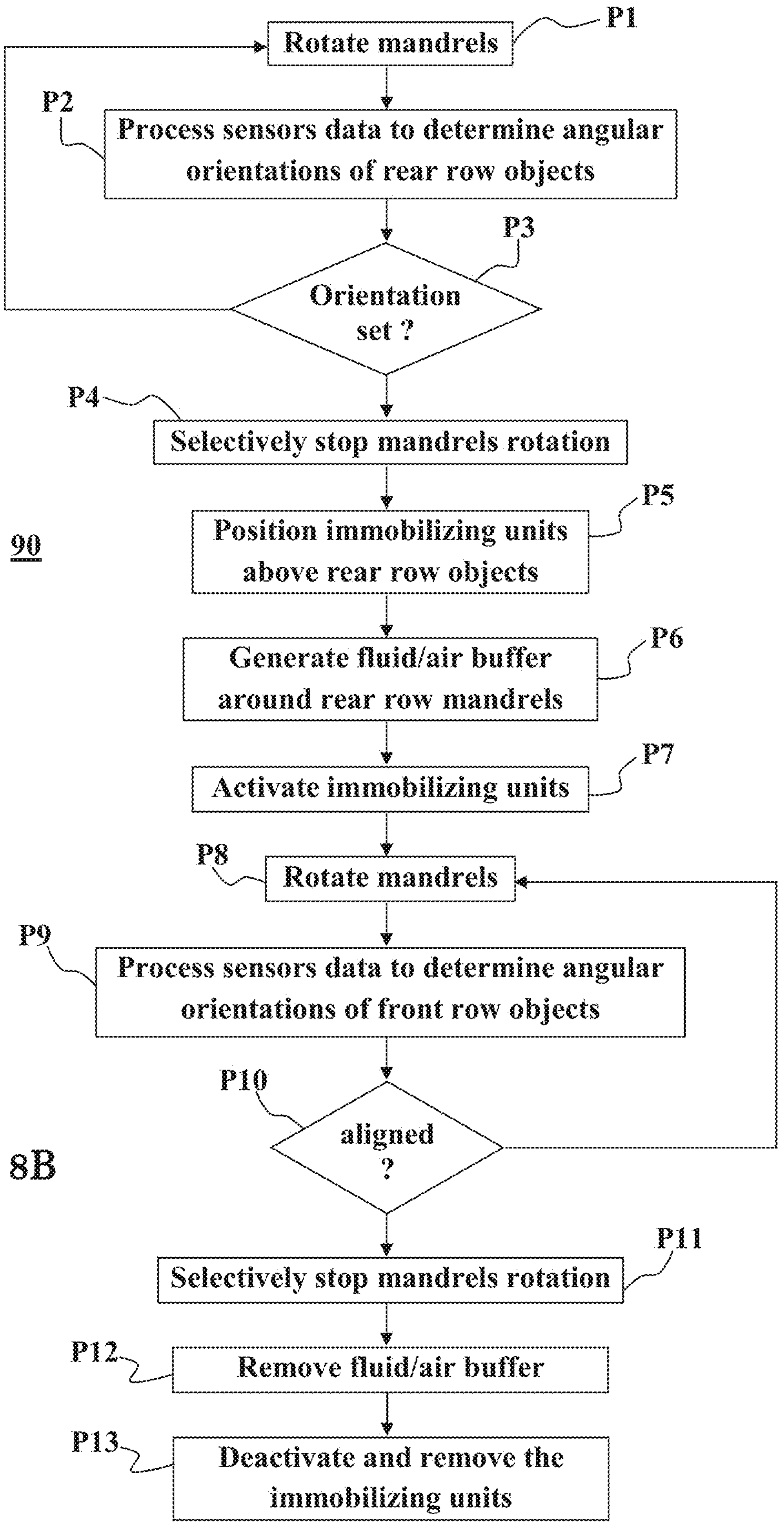

FIG. 8B shows a flowchart 90 of a registration process according to some possible embodiments. Referring now to FIGS. 8A and 8B, in steps P1 to P4 orientation of the rear row objects, 101*a*', 101*b*', and 101*c*', is set by control unit 300 in step P1 by generating control signals/data 324 for rotating all of the mandrels 412 (i.e., all objects carried by the carriage are rotated), processing in step P2 the signals/data 322 generated by the sensor units, 43*a*, 43*b*, and 43*c*, to identify locations of the marks 49 on the rear row objects, and determining in step P3 based on the received sensors signals/data 322 for each rear row object if its orientation is set to a predefined angular position. In step P4 operation of the motors, Ma, Mb and Mc, is selectively stopped until angular position of all of the rear row objects, 101*a*', 101*b*', and 101*c*', is set i.e., each motor is stopped upon determining that the respective object thereby rotated reached the desired angular position. As described hereinabove, setting the orientations of the rear row objects in steps P1 to P4 is performed if orientations of all objects carried by the carriage should be set to the same angular position. If step P1 to P4 are not performed, the remaining process steps P5 to P12 will just align the pair of adjacently located objects (101*a* 101*a*'), (101*b* and 101*b*'), and (101*c* and 101*c*').

In step P5 the control unit 300 generates control signals/data 320 for moving the platform 422*p* of the immobilizing system 422 towards the carriage 12 to place each immobilizing unit, 42*a*, 42*b*, and 42*c*, adjacently above a respective rear row object, 101*a*', 101*b*', and 101*c*'. Concurrently, or shortly thereafter, in step P6 the control unit 300 generates control signals/data 323 to activate the pressure unit 45 for supplying fluid/air pressure to the rear row mandrels, 412*a*', 412*b*', and 412*c*', and form fluid/air buffers 219 around them. After forming the fluid/air buffers 219 around the rear row mandrels, 412*a*', 412*b*', and 412*c*', in step P7 the control unit 300 generates control signals/data 321 to activate the immobilizing units, 42*a*, 42*b*, and 42*c*, to thereby hold the rear row objects, 101*a*', 101*b*', and 101*c*', substantially immobilized.

In step P8 control signals/data 324 are generated to rotate the mandrels 412. All of the mandrels 412 of the carriage 12 are rotated in step P8, but since the rear row objects, 101*a*', 101*b*', and 101*c*', are held immobilized due to the attraction forces applied by the immobilizing units, 42*a*, 42*b*, and 42*c*, and the fluid/air buffers 291 formed around the rear row mandrels, 412*a*', 412*b*', and 412*c*', only the front row objects, 101*a*, 101*b*, and 101*c*, are actually rotated. In step P9 the sensor signals/data 322 is processed to identify the locations of the marks 49, and in step P10 it is checked if each of the front row mandrels reached an angular position aligning it with the respective adjacently located rear row object.

In step P11 control unit 300 selectively stops each of the motors, Ma, Mb and Mc, upon determining that the object thereby carried is aligned with its respective adjacently located rear row object. After the motors, Ma, Mb and Mc, are stopped, in step P12 the control unit 300 deactivates the pressure unit 45, and in step P13 deactivates the immobilizing units, 42*a*, 42*b*, and 42*c*, and moves the platform 422*p* of the immobilizing system 422 away from the carriage 12.

Figure 9A:
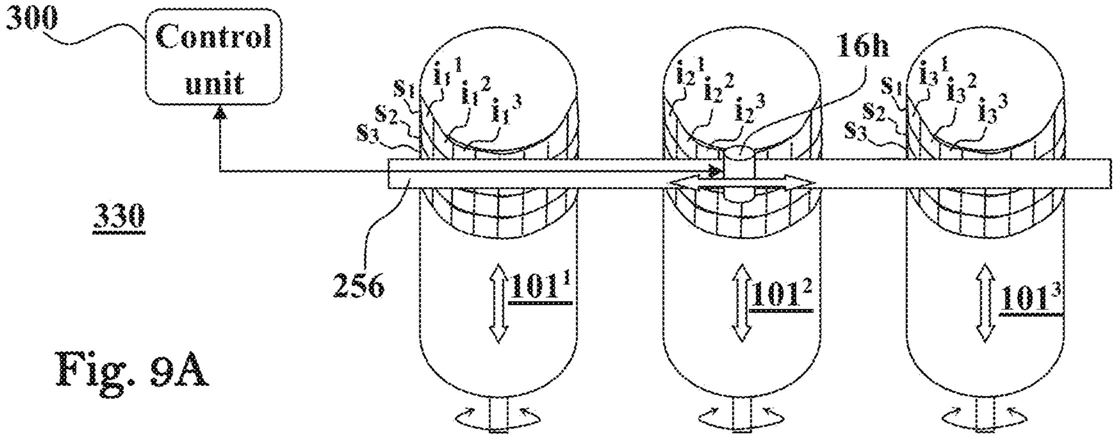
FIGS. 9A and 9B schematically illustrate imaging systems configured for inspection of a plurality of objects, according to some embodiments, wherein FIG. 9A demonstrates an imaging unit comprising a movable imager assembly utilizing a single imager for scanning outer surfaces of objects in an array of objects, by acquiring a plurality of small images along circumferential strips of the objects, and FIG. 9B demonstrates use of a plurality of movable imaging units, each comprising a movable imager assembly as shown in FIG. 9A, configured for scanning outer surfaces of objects of a plurality of array of objects.
Figure 9B:
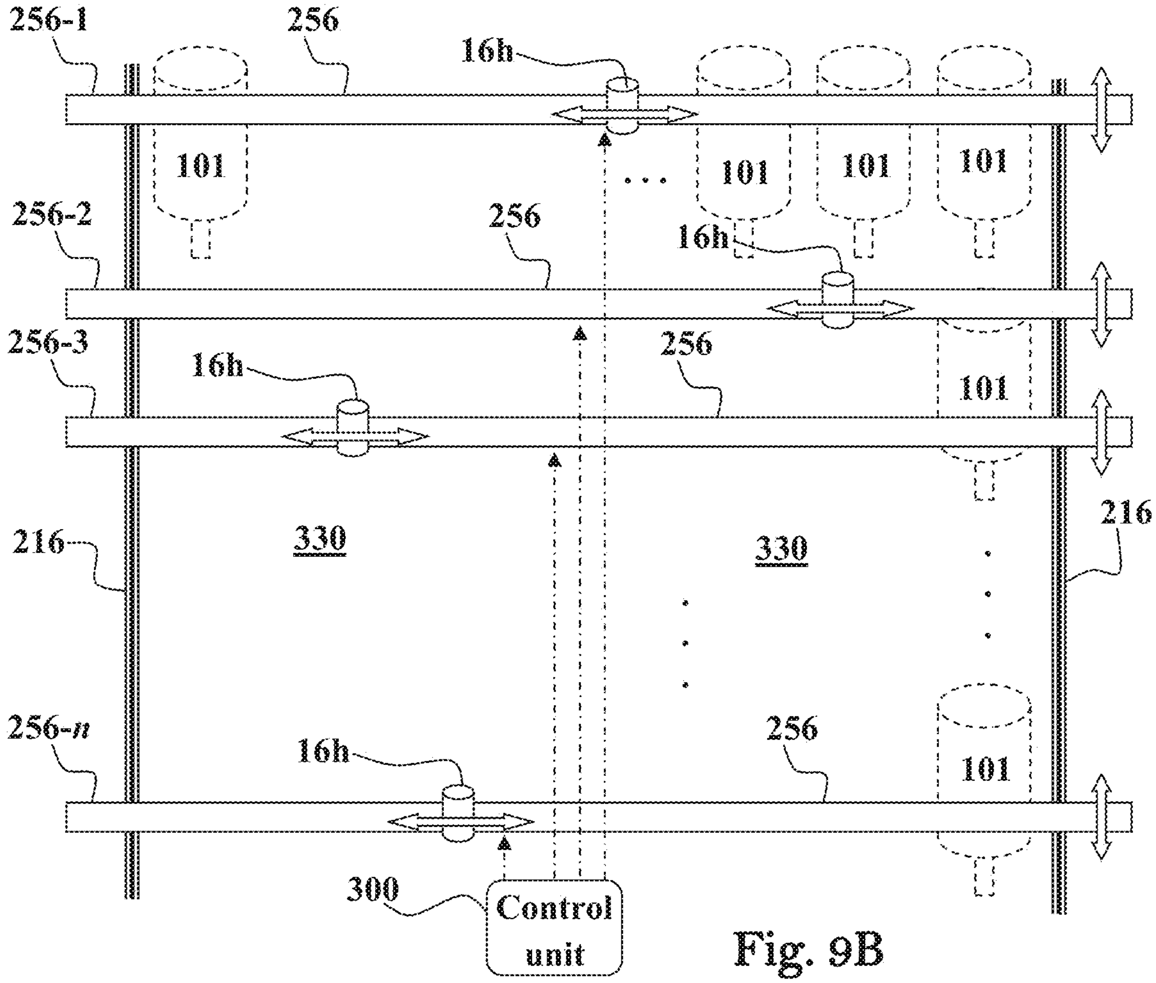

FIGS. 9A and 9B schematically illustrate possible embodiments of the inspection system 330 (Ins in FIG. 1). FIG. 9 demonstrates an inspection system 330 using a movable imager unit 16*h* for scanning the outer surfaces of the objects 101. Optionally, and in some embodiments preferably, the imager unit 16*h* is mounted on a rail 256 located a distance above (or below) the objects 101 and configured to slide in lateral directions therealong e.g., using one or more motors and mechanical transmissions (not shown). The movement of the imager unit 16*h* is controlled by the control unit 300, which is also configured to receive acquired fragmental images $i_j^k$ (where j>0 and k>0 are positive integers) from each object 101*i*, and to tailor from the received fragmental images $i_j^k$ for each object $\mathbf{101}^j$ a mosaic image of its entire outer surface showing the treatment applied thereto and/or the patterns printed thereon.

In some embodiments, the control unit 300 is configured to move the imager unit 16*h* along the rail 256 when the translational movement of the streams of objects 101 is stopped, to acquire a fractional image $i_j^k$ within a circumferential strips $s_q$ (where q>0 is a positive integer), of each object $\mathbf{101}^j$. As the objects 101 may be continuously rotated in each stop, the imager unit 16*h* may be moved multiple times over the rail 256 within each stop to acquire consecutive fractional images $i_j^{k+1}$, $i_j^{k+2}$, . . . of each circumferential strip $s_q$, until fragmental images on the entire circumferential strip $s_q$ of each object $\mathbf{101}^j$ are obtained and tailored by the control unit 300. This process is repeated for each step movement of the objects 101 until obtaining entire set of circumferential strips $s_1, s_2, s_3, \ldots, s_q$ for each of the objects 101. The tailored strips of each object 101 can be then tailored by the control unit 300 to construct a mosaic image for each object showing the patterns printed on its outer surface.

Alternatively, if the objects 101 are continuously rotated in each stop, the control unit 300 can be configured to position the imager unit 16*h* at discrete locations along the rail 256 for acquiring an entire circumferential strip $s_q$, of each object 101$^j$, in a consecutive manner. In this case, the control unit 300 is configured to construct a mosaic of the circumferential strip $s_q$ acquired for of the objects 101$^j$.

The imager unit 16*h* can be configured to acquire fragmental images $i_j^k$ in a size of a single pixel, of a row of pixels, or a matrix of pixels. For example, in some possible embodiments the movable imager unit 16*h* is an elongated imager unit, and in this case an ordered sequence of elongated images can be acquired by the control unit 300 within a single stop of the translational movement of the objects 101. The sequence of elongated images acquired from each object can be then tailored by the control unit 300 to construct for each object a mosaic of elongated images showing the patterns printed on its outer surface.

In some possible embodiments the imager unit 16*h* is configured to acquire elongated strips covering the entire length of each object 101. Thus, the control unit 300 can be configured to consecutively place the imager unit 16*h* at discrete locations along the rail 256 for acquiring elongated strip images of each object 101$^j$ as it is being rotated. In this way, for example, the control unit 300 first locate the imager unit 16*h* near object 101$^1$ to acquire all elongated strip images thereof while it is being rotated, to thereby enable construction of a mosaic image thereof. The control unit 300 then moves the imager unit 16*h* near object 101$^2$ to acquire all elongated strip images thereof while it is being rotated, to thereby enable construction of a mosaic image thereof, and so on, until all strip images are acquired from all of the objects 101. The support platform on which the streams of objects are mounted is then moved along the lane to place a new row of objects 101 for inspection, as described above.

Optionally, and in some embodiment preferably, the imager unit 16*h* comprises two or more imagers. For example, in some possible embodiments the imager unit 16*h* comprises a high resolution imager (e.g., capable of imaging single microns sizes), and a low resolution imager (e.g., capable of imaging ten microns, or greater sizes).

In some possible embodiments the image unit 16*h* is configured for movement in other directions. For example, in some embodiments the rail 256 may be configured to move up and down relative to the objects 101, as exemplified in FIG. 9B. Additionally, in some possible embodiments, the imager unit 16*h* is configured for movement in a plane substantially parallel to the plane in which the objects 101 are located e.g., by using vertical rails 216 at discrete locations extending vertically from the horizontal rail 256, or a matrix of interconnected rails (not shown), or by mounting the imager unit 16*h* on a robotic arm (not shown).

When the imager unit 16*h* is configured to move in a plane to acquire the images from the objects 101, in each stop of the support platform the control unit 300 can move the imager unit 16*h* in the plane in any desirable, or random, pattern to acquire fractional images $i_j^k$ from the objects, using any of the techniques described above e.g., if the objects are continuously rotated, by sequentially acquiring circumferential images $s_q$ from the objects 101, by acquiring elongated strips images of entire objects. Optionally, and in some embodiments preferably, the imager unit is moved in the plane to acquire images from objects in consecutive rows, so as to image one or more (or entire) streams of objects rotated on the support platform without requiring axial movements to be performed for the imaging.

The control unit 300 is configured in some embodiments to selectively acquire images from a limited number of objects 101 in each stream of objects carried by the support platform. In such selective sampling approach the control unit 300 may be configured to select certain objects as samples based on preset data, or randomly. The number of objects to be used as samples can be determined based on the number of objects carried by the support platform/carriage.

In some possible embodiments the imaging of the objects is performed without stopping the translational and rotational movement of the objects 101 i.e., the objects are imaged while being rotated and axially moved. In this case the imaging unit can be a stationary and the images are spirally acquired, such that a diagonal strip image of the moved and rotated object is obtained. The control unit 300 can be configured to transform the diagonal strip image into a rectangular form using the a ratio of the rotational and axial velocities of the objects. For example, the control unit 300 can be configured and operable to determine from the ratio between the rotational and axial velocities of the objects a transformation angle, and use it to transform the diagonal strip images into rectangular images.

As shown in FIG. 9B, in some embodiments the inspection system 330 comprise a plurality of imagers 16*h*, each imager 16*h* being configured for sideway (right-to left or left-to right) movement along a rail 256 located above (or below) a row of objects 101 of an objects array, to acquire imagery data from the objects. Each rail 256 can be configured to move vertically along rails 216 for further allowing lengthwise scanning of the objects 101 in the row or objects. The control unit 300 can be thus configured to generate control signals/data for moving each of the imagers 16*h* in sideway directions along its respective rail 256 to acquire imagery data for object 101 in a certain row of objects, and/or vertically move the rail 256 along the rails 216 for positioning the imager 16*h* at a desired location along the lengths of the objects 101 in the row. The control unit 300 can be configured to assign a respective movable rail 256 and its respective imager 16*h* to each row of objects. Alternatively, or additionally, the control unit 300 can be configured to assign two or more of movable rails, and their respective imagers 16*h* to a certain row of objects in the array of objects.

The inspection of the objects by one of more imaging units, as described herein and illustrated in the drawings, can be performed in any one of the object treatment processes T1, T2 . . . Tn, along the lane 17 e.g., in a printing zone, at the vision inspection zone (Ins), priming and/or curing zones. Optionally, and in some embodiments preferably, the inspection of the objects by the one or more imaging units is performed in an unload zone prior to unloading of the objects from the lane 17.

Terms such as top, bottom, front, back/rear, right, and left and similar adjectives in relation to orientation of the objects and system components, refer to the manner in which the illustrations are positioned on the paper, not as any limitation to the orientations in which the apparatus can be used in actual applications. It should also be understood that throughout this disclosure, where a process or method is shown or described, the steps of the method may be performed in any order or simultaneously, unless it is clear from the context that one step depends on another being performed first.

It will further be appreciated that the processes/methods described herein may be realized as computer executable code created using a structured programming language (e.g., C), an object oriented programming language such as C++, or any other high-level or low-level programming language (including assembly languages, hardware description languages, and database programming languages and technologies) that may be stored, compiled or interpreted to run on at least one of the processing/control units, as well as heterogeneous combinations of processors, processor architectures, or combinations of different hardware and software. The processing may be distributed across a number of computerized devices, which may be functionally integrated into a dedicated standalone system. All such permutations and combinations are intended to fall within the scope of the present disclosure.

A control system suitable for use with embodiments described hereinabove may include, for example, one or more processors connected to a communication bus, one or more volatile memories (e.g., random access memory—RAM) or non-volatile memories (e.g., Flash memory). A secondary memory (e.g., a hard disk drive, a removable storage drive, and/or removable memory chip such as an EPROM, PROM or Flash memory) may be used for storing data, computer programs or other instructions, to be loaded into the computer system. For example, computer programs (e.g., computer control logic) may be loaded from the secondary memory into a main memory for execution by one or more processors of the control system. Alternatively or additionally, computer programs may be received via a communication interface. Such computer programs, when executed, enable the computer system to perform certain features of the present invention as discussed herein. In particular, the computer programs, when executed, enable a control processor to perform and/or cause the performance of features of the present invention. Accordingly, such computer programs may implement controllers of the computer system.

In an embodiment where the invention is implemented using software, the software can be stored in a computer program product and loaded into the computer system using the removable storage drive, the memory chips or the communications interface. The control logic (software), when executed by a control processor, causes the control processor to perform certain functions of the invention as described herein.

In another embodiment, features of the invention are implemented primarily in hardware using, for example, hardware components such as application specific integrated circuits (ASICs) or field-programmable gated arrays (FPGAs). Implementation of the hardware state machine so as to perform the functions described herein will be apparent to persons skilled in the relevant art(s). In yet another embodiment, features of the invention can be implemented using a combination of both hardware and software.

As described hereinabove and shown in the associated figures, the present disclosure provides system and machinery for treating array of objects, and related methods. While particular embodiments of the invention have been described, it will be understood, however, that the invention is not limited thereto, since modifications may be made by those skilled in the art, particularly in light of the foregoing teachings. As will be appreciated by the skilled person, the invention can be carried out in a great variety of ways, employing more than one technique from those described above, all without exceeding the scope of the claims.

The invention claimed is:

1. An object alignment system, comprising:

two rows of rotatable grippers, each one of said rotatable grippers is configured to receive an object and to controllably change between an engaged state in which gripper components thereof contacts said object, and a released state in which its gripper components not contacting said object;

an immobilizing unit configured to engage and immobilize one row of said objects while their rotatable grippers are in the released state; and a control unit configured to set one row of said rotatable grippers into a released state and immobilize the objects thereby carried by engaging their objects by said immobilizing unit, set the other row of said rotate grippers into an engaged state, affect rotation of the rotatable grippers while the objects of said one row of rotatable grippers are engaged and immobilized by said immobilizing unit while their rotatable grippers are in the released state until angular position of at least one of the objects being rotated is aligned with angular position of at least one of the immobilized objects.

2. The object alignment system according to claim 1 wherein the rotatable grippers in the one row of the rotatable grippers extend in a direction opposite to a direction of the rotatable grippers in the other row of said rotatable grippers.

3. The object alignment system according to claim 1 wherein the grippers are arranged on a support platform movable along a lane.

4. The object alignment system according to claim 3 wherein the immobilizing unit is movable with respect to the lane for controllably engaging the one row of objects when the support platform is within a certain section of the lane.

5. The object alignment system according to claim 1 wherein each one of the rotatable grippers is configured to controllably form a fluid buffer between the object thereby held and its gripping components in the released state of said rotatable gripper.

6. The object alignment system according to claim 1 comprising one or more sensor units configured to generate measurement data/signals indicative of angular position of at least some of the objects.

7. The object alignment system according to claim 6 wherein the sensor units are used to detect one or more defined markers on the objects.

8. The object alignment system according to claim 6 wherein the defined markers are selected to include at least one marker from the following group: a printed marker; a painted marker; an engraved marker; a laser marker; a magnetically detectable marker; an RF radiating marker; an NMR detectable marker.

9. The object alignment system according to claim 6 wherein at least one of the one or more sensor units is movable along a length of at least one row of the rotatable grippers.

10. The object alignment system according to claim 6 wherein the control unit is configured and operable to receive and process the measurement data/signals from the one or more sensor units, and stop the rotations of at least one pair of the rotatable grippers upon determining that angular position of at least one of the rotated objects is aligned with angular position of at least one of the immobilized objects.

11. The object alignment system according to claim 1 wherein the immobilizing unit is configured to apply attraction forces over the objects in the row of objects thereby engaged and immobilized.

12. The object alignment system according to claim 1 wherein the immobilizing unit comprises at least one applicator from the following group: vacuum/suction applicator; electromagnetic application; electrostatic applicator; electric field applicator.

13. A method of aligning objects, comprising:

holding objects by first and second adjacently located rows of rotatable grippers;

setting said first row of rotatable grippers into a released state in which griping components of said first row of rotatable grippers are not contacting the objects thereby held, and setting the second row of rotatable grippers into an engaged state in which griping components of said second row of rotatable grippers are contacting the objects thereby held;

immobilizing the objects carried by said first row of rotatable grippers; and rotating the objects carried by said second row of rotatable grippers while the objects carried by said first row of rotatable grippers are immobilized, until angular position of at least one of the rotated objects is aligned with angular position of at least one of the immobilized objects.

14. The method according to claim 13 comprising moving the support platform into a certain section of a lane before the immobilizing of the objects.

15. The method according to claim 13 comprising forming a fluid buffer between the gripping components of the first row of rotatable grippers and the objects held by said first row of rotatable grippers when setting said rotatable grippers into the released state.

16. The method according to claim 13 comprising acquiring measurement data/signals from one or more sensor units indicative of angular position of at least some of the objects.

17. The method according to claim 16 comprising detecting in the measurement data/signals one or more defined markers on the objects.

18. The method according to claim 16, comprising moving at least one of the one or more sensor units along a length of at least one row of the rotatable grippers.

19. The method according to claim 16 comprising processing the measurement data/signals from the one or more sensor units and stopping the rotations of at least some of the rotatable grippers upon determining that angular position of at least one of the rotated objects is aligned with angular position of at least one of the immobilized objects.

20. The method according to claim 13 comprising applying attraction forces over the objects carried by the first row of rotatable grippers for immobilizing said objects.

* * * * *